US006373432B1

(12) United States Patent
Rabinowitz et al.

(10) Patent No.: US 6,373,432 B1
(45) Date of Patent: Apr. 16, 2002

(54) SYSTEM USING LEO SATELLITES FOR CENTIMETER-LEVEL NAVIGATION

(75) Inventors: Matthew Rabinowitz, Palo Alto; Bradford W. Parkinson, Los Altos; Clark E. Cohen, Palo Alto; David G. Lawrence, Mountain View, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/625,419

(22) Filed: Jul. 25, 2000

Related U.S. Application Data

(63) Continuation of application No. 09/287,523, filed on Apr. 7, 1999, now abandoned, which is a continuation of application No. 09/167,520, filed on Oct. 6, 1998, now abandoned, which is a continuation of application No. 09/045,497, filed on Mar. 20, 1998, now abandoned.
(60) Provisional application No. 60/041,184, filed on Mar. 21, 1997.

(51) Int. Cl.$^7$ .............................. G01S 5/02; H04B 7/185
(52) U.S. Cl. ............................ 342/357.16; 342/357.04; 342/357.06; 342/3; 342/357.02; 701/213
(58) Field of Search ...................... 342/357.01, 357.04, 342/357.06, 357.02, 357.16; 701/213; 455/12.1

(56) References Cited

U.S. PATENT DOCUMENTS

| 4,797,677 A | | 1/1989 | MacDoran et al. .......... 342/352 |
|---|---|---|---|
| 4,963,889 A | | 10/1990 | Hatch .......................... 342/357 |
| 5,041,833 A | * | 8/1991 | Weinberg .................... 342/357 |
| 5,296,861 A | | 3/1994 | Knight ......................... 342/357 |
| 5,365,447 A | | 11/1994 | Dennis ........................ 364/449 |
| 5,384,574 A | | 1/1995 | Counselman, III .......... 342/357 |
| 5,467,282 A | | 11/1995 | Dennis ........................ 364/449 |
| 5,515,062 A | * | 5/1996 | Maine et al. ................ 342/457 |
| 5,572,218 A | | 11/1996 | Cohen et al. ................ 342/357 |
| 5,608,722 A | | 3/1997 | Miller ......................... 370/320 |
| 5,646,630 A | * | 7/1997 | Sheynblat et al. .......... 342/357 |

OTHER PUBLICATIONS

Rabinowitz et al., "The application of LEOS to Cycle Ambiguity Resolution on Navstar Transmissions for Kinematic Carrier–Phase Positioning", Institute of Navigation, ION97, No. 1, Sep. 1997.
Cohen et al., "Real Time Flight Testing Using Integrity Beacons for GPS Category III Precision Landing", Navigation: J. of The Institute of Navigation, vol. 41, No. 2, Jul. 1994.

(List continued on next page.)

Primary Examiner—Dao Phan
(74) Attorney, Agent, or Firm—Fish & Richardson P.C.

(57) ABSTRACT

Disclosed herein is a system for rapidly resolving position with centimeter-level accuracy for a mobile or stationary receiver [4]. This is achieved by estimating a set of parameters that are related to the integer cycle ambiguities which arise in tracking the carrier phase of satellite downlinks [5,6]. In the preferred embodiment, the technique involves a navigation receiver [4] simultaneously tracking transmissions [6] from Low Earth Orbit Satellites (LEOS) [2] together with transmissions [5] from GPS navigation satellites [1]. The rapid change in the line-of-sight vectors from the receiver [4] to the LEO signal sources [2], due to the orbital motion of the LEOS, enables the resolution with integrity of the integer cycle ambiguities of the GPS signals [5] as well as parameters related to the integer cycle ambiguity on the LEOS signals [6]. These parameters, once identified, enable real-time centimeter-level positioning of the receiver [4]. In order to achieve high-precision position estimates without the use of specialized electronics such as atomic clocks, the technique accounts for instabilities in the crystal oscillators driving the satellite transmitters, as well as those in the reference [3] and user [4] receivers. In addition, the algorithm accommodates as well as to LEOS that receive signals from ground-based transmitters, then re-transmit frequency-converted signals to the ground.

19 Claims, 15 Drawing Sheets

OTHER PUBLICATIONS

Spilker Jr. et al., "Overview of GPS operation and design", Global Positioning System: Theory and Applications, vol. 1, pp.29–55, 1995.

J. Van Dierendonck, "GPS Receivers", Global Positioning System: Theory and Applications, vol. 1, pp. 329–407, 1995.

Hassibi et al., "Integer parameter estimation in linear models with application to GPS", IEEE Trans. on Signal Processing, Nov. 1998.

Parkinson et al., "Autonomous GPS Integrity Monitoring Using the Pseudorange Residual", Navigation: J. of The Institute of Navigation, vol. 35, No. 2, Summer 1988.

Clark E. Cohen, et al., "Flight Test Results of Autocoupled Approaches Using GPS and Integrity Beacons", ION GPS–94, Salt Lake City, Utah, Sep. 1994.

Boris S. Pervan, et al., "Integrity in cycle ambiguity resolution for GPS–based precision landing", Third International Conference on Differential Satellite Navigation Systems (DSNS–94), London, UK 1994.

Stuart A Long, et al., "A Dual–Frequency Stacked Circular Disc Antenna," IEEE Transactions on Antennas and Propagation, vol. AP–27, pp. 270–273, Mar. 1979.

A. A. Kishk, et al., "Single–Element Rectangular Microstrip Antenna for Dual Frequency Operation", Electronics Letters, vol. 19, pp 298–300, Mar. 14, 1983.

C.E. Cohen et al., "Real–Time Cycle Ambiguity Resolution Using a Pseudolyte for Precision Landing of Aircraft with GPS", Second International Conference on Differential Satellite Navigation Systems (DSNS–93), Mar.–Apr. 1993.

L. Babai, et al., "On Lovasz Lattice Reduction and the Nearest Lattice Point Problem", Combinatorica, An International Journal of the Janos Bolyai Mathematical Society, vol. 6, pp. 1–13, 1986.

Gene H. Golub, et al., "Matrix Computations", The Johns Hopkins University Press, $3^{rd}$ Edition, 1996.

R. E. Kalman, et al., "New Results in Linear Filtering and Prediction Theory", ASME Transactions, Journal of Basic Engineering, vol. 83, pp. 95–108, 1961.

Bradford W. Parkinson, "GPS Error Analysis", Global Positioning System: Theory and Applications, vol. I, Chapter 11, ppl 469–483, 1994.

Bradford W. Parkinson, "Orbit Determination", Global Positioning System: Theory and Application, vol. II, Chapter 21, pp. 559–592, 1994.

Clark Emerson Cohen, Ph.D., "Attitude determination using GPS: Development of an all solid–state guidance, navigation, and control sensor for air and space vehicles based on the global positioning system," Stanford University, pp. 1–184, 1992.

Boris Steven Pervan, "Navigation Integrity for Aircraft Precision Landing Using the Global Postioning System", Stanford University, pp. 1–172, 1996.

Robert F. Stengel, "Optimal Control and Estimation", Dover Publications, Inc., Jun. 1986.

* cited by examiner

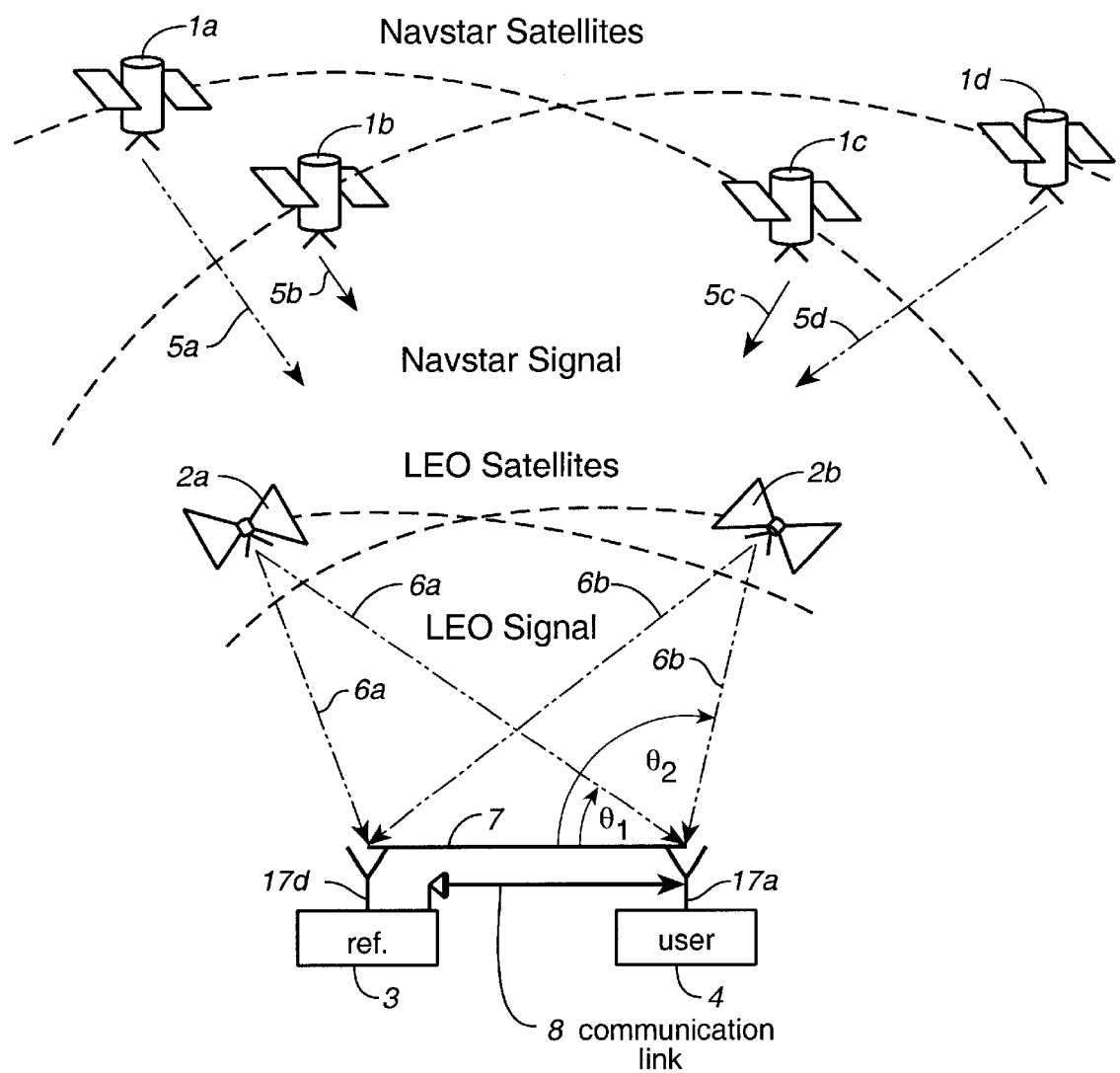
FIG._1

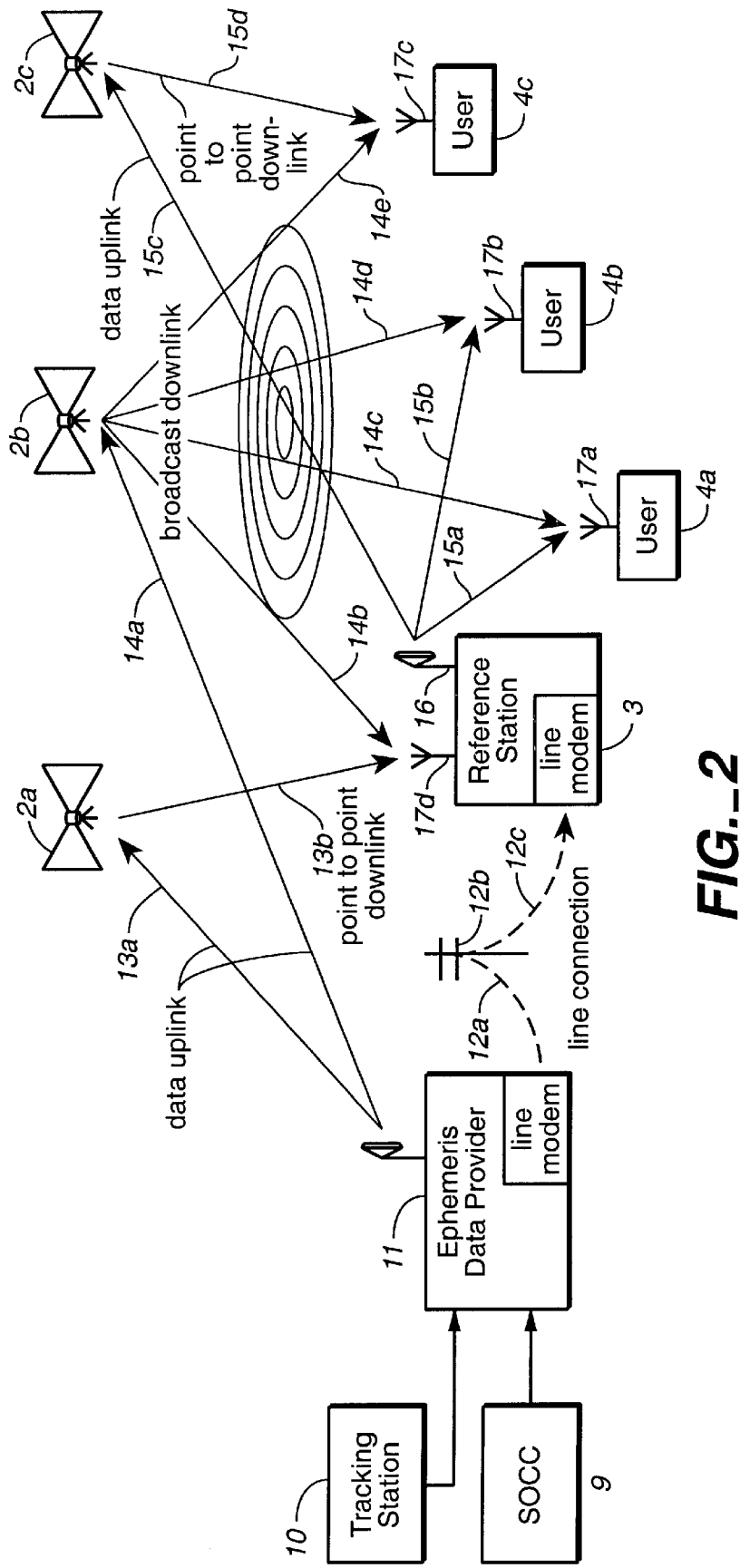
FIG._2

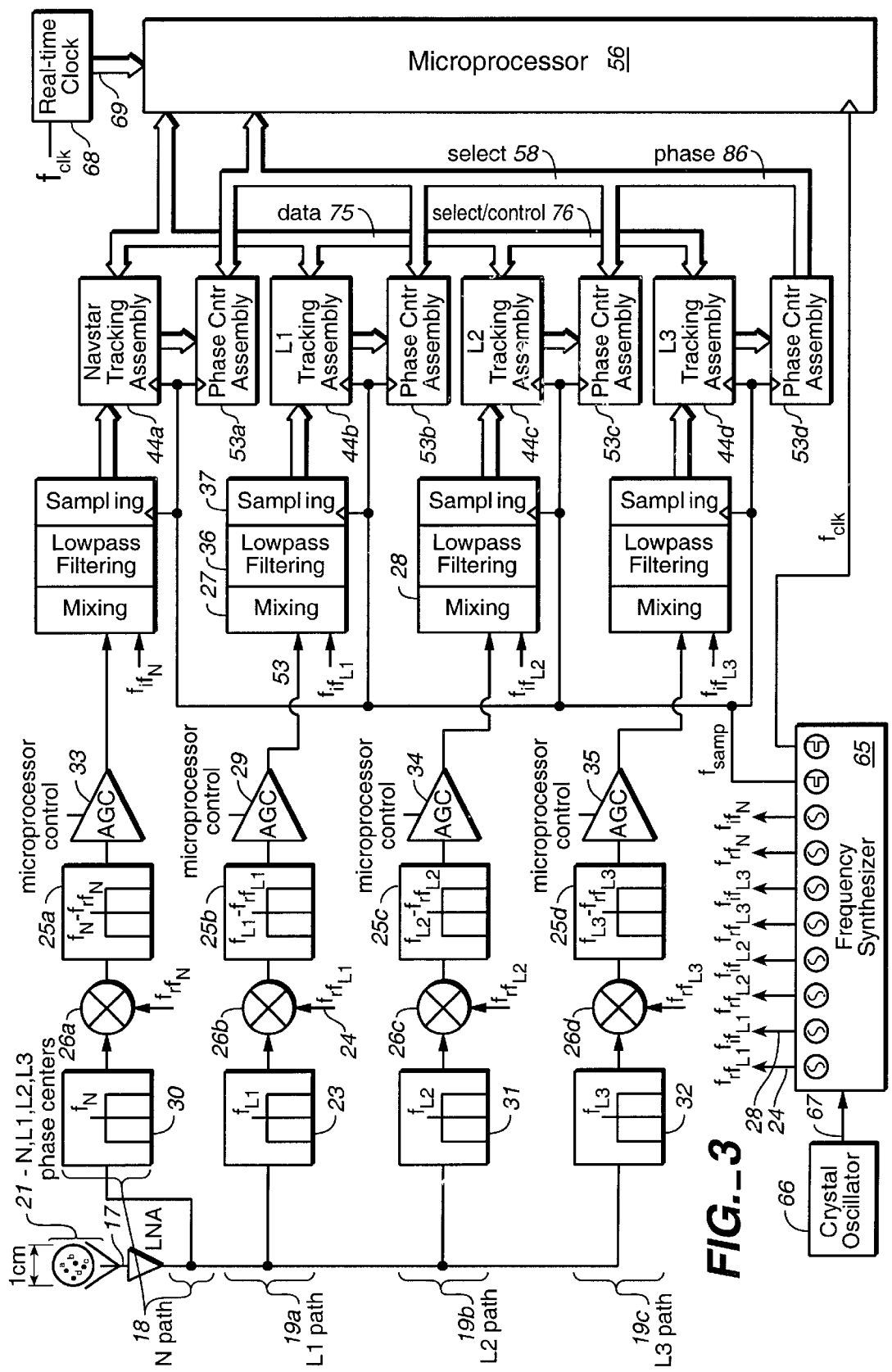
FIG._3

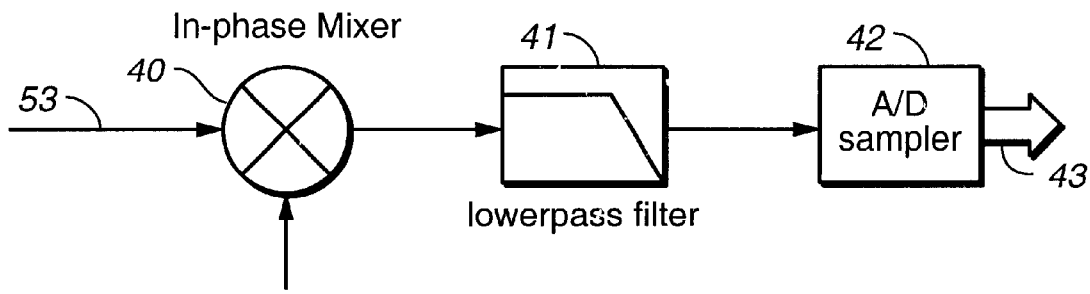
FIG._4a
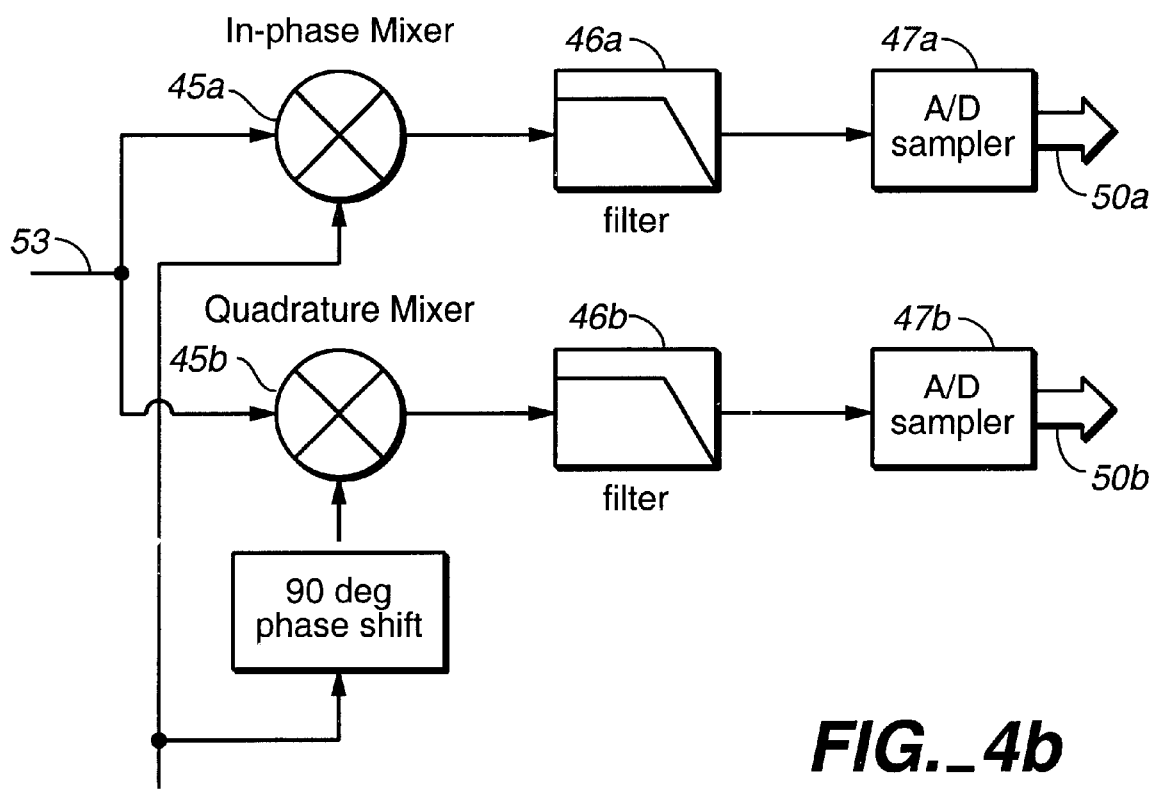
FIG._4b

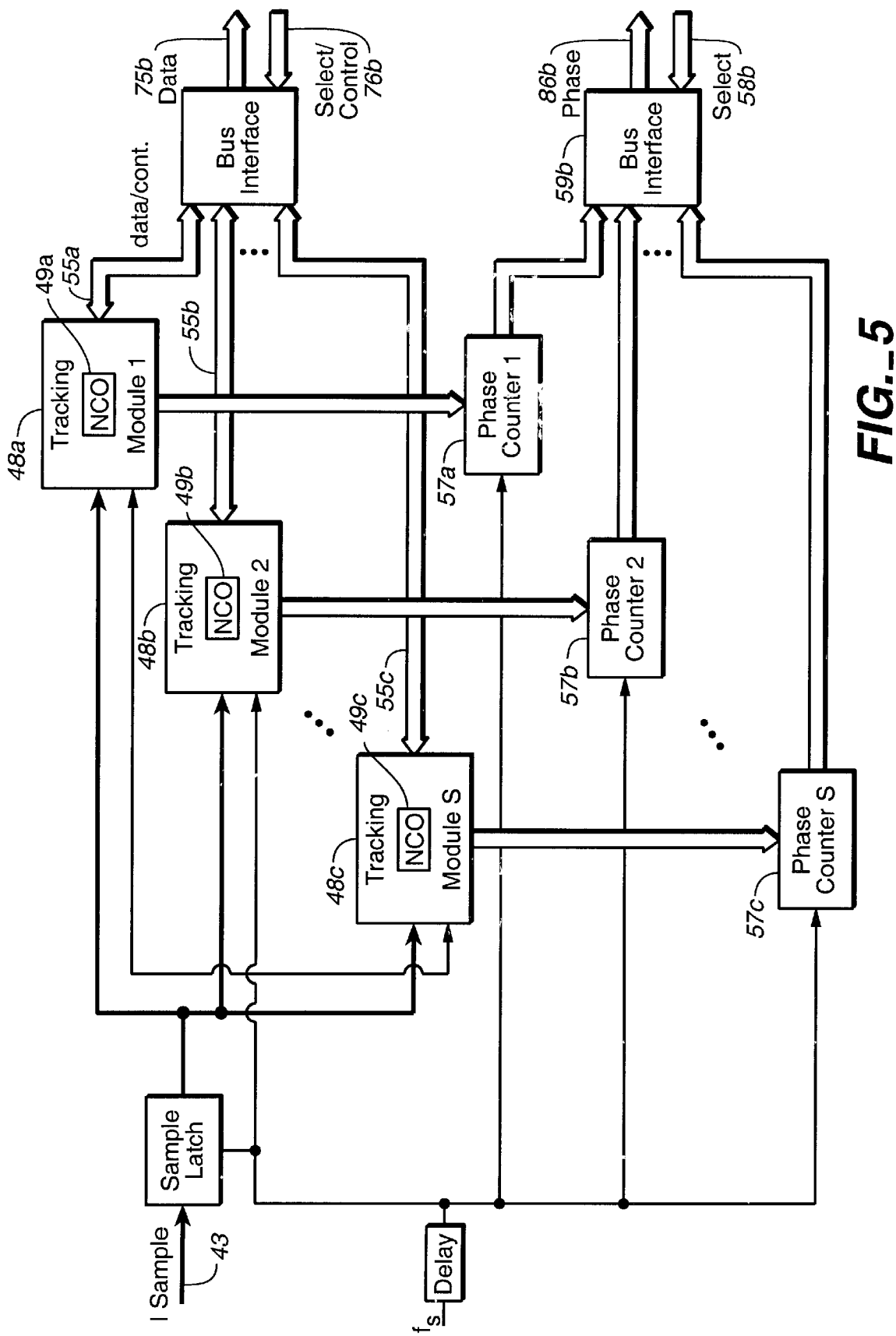
FIG._5

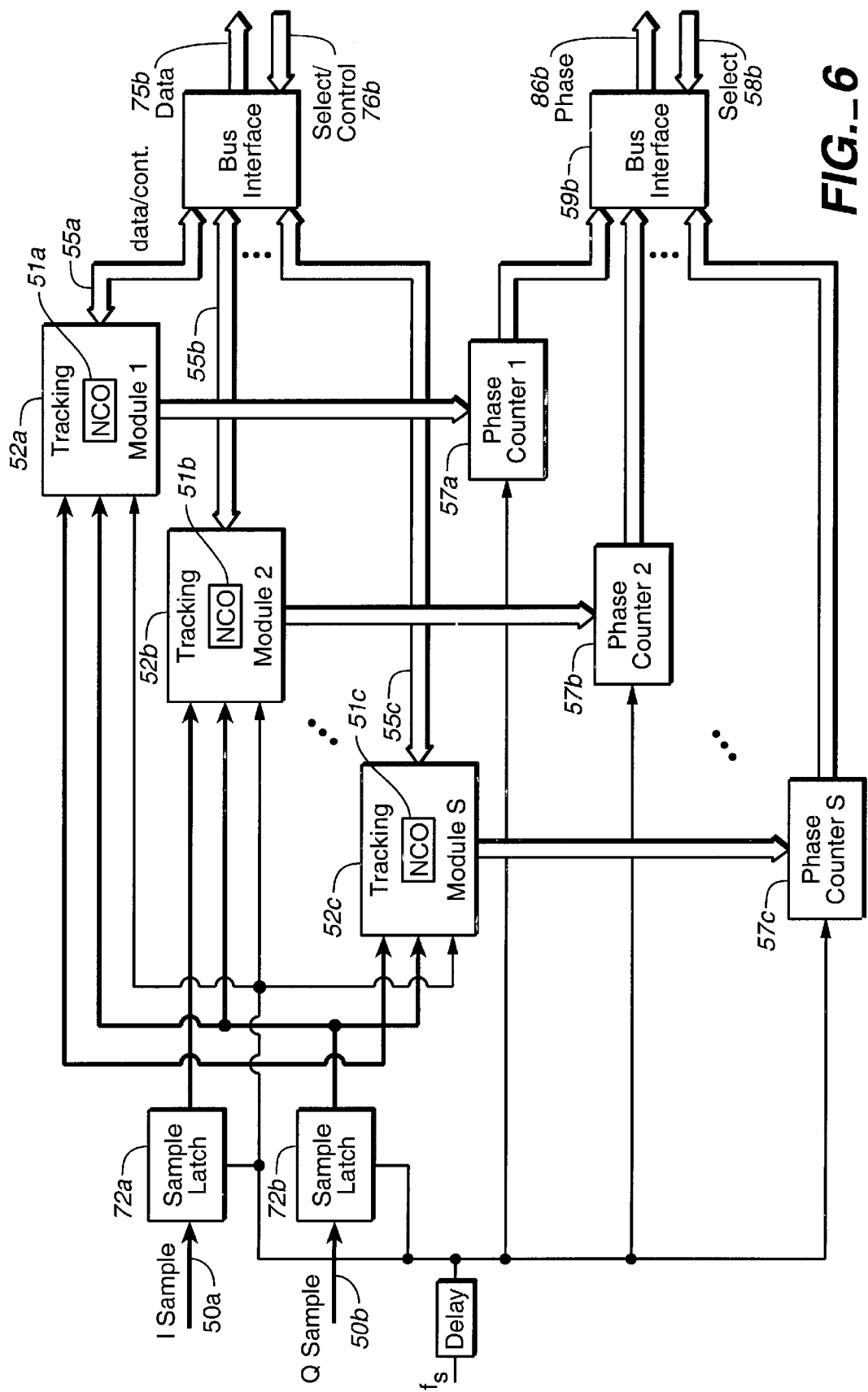
FIG._6

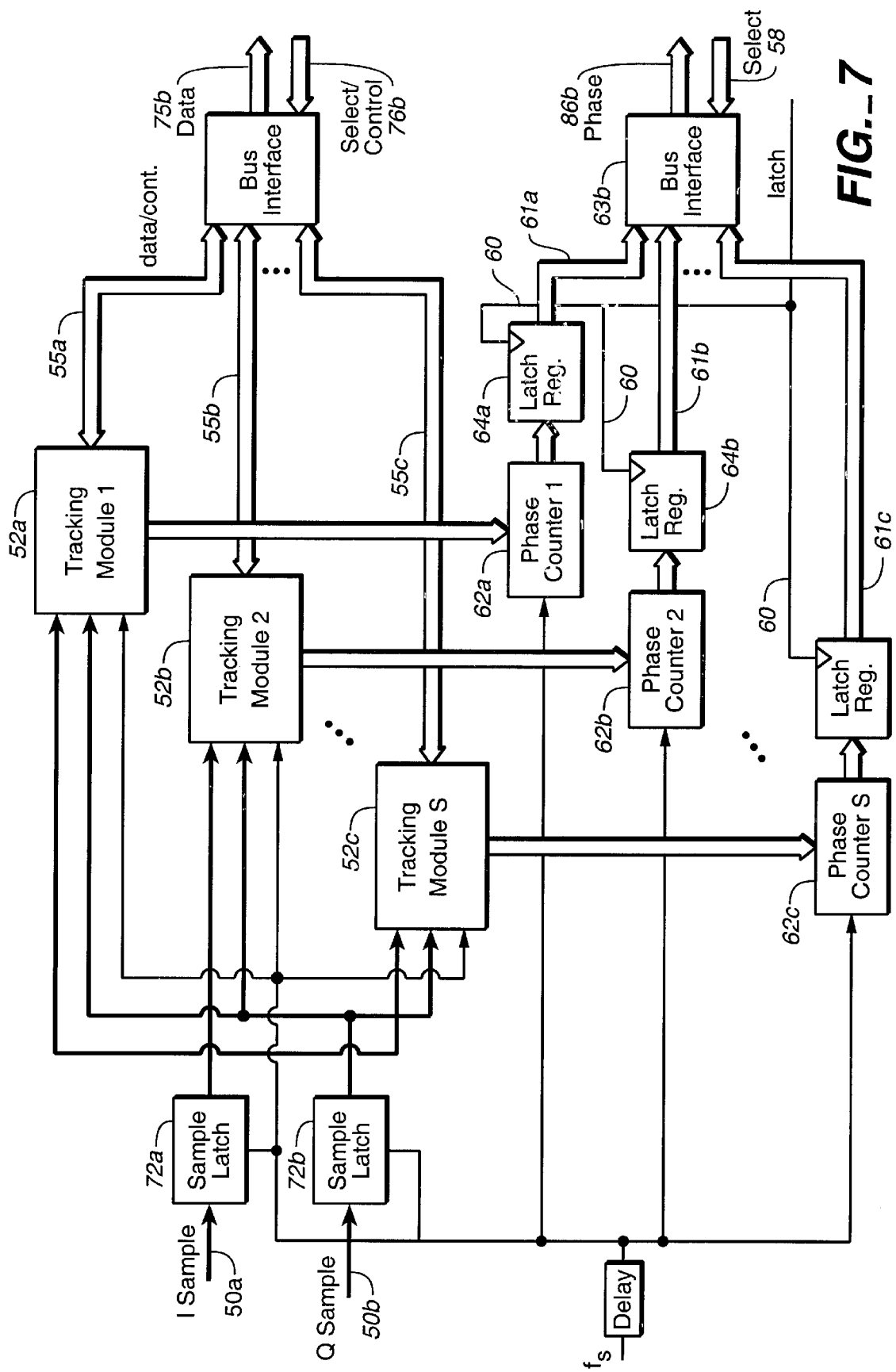
FIG._7

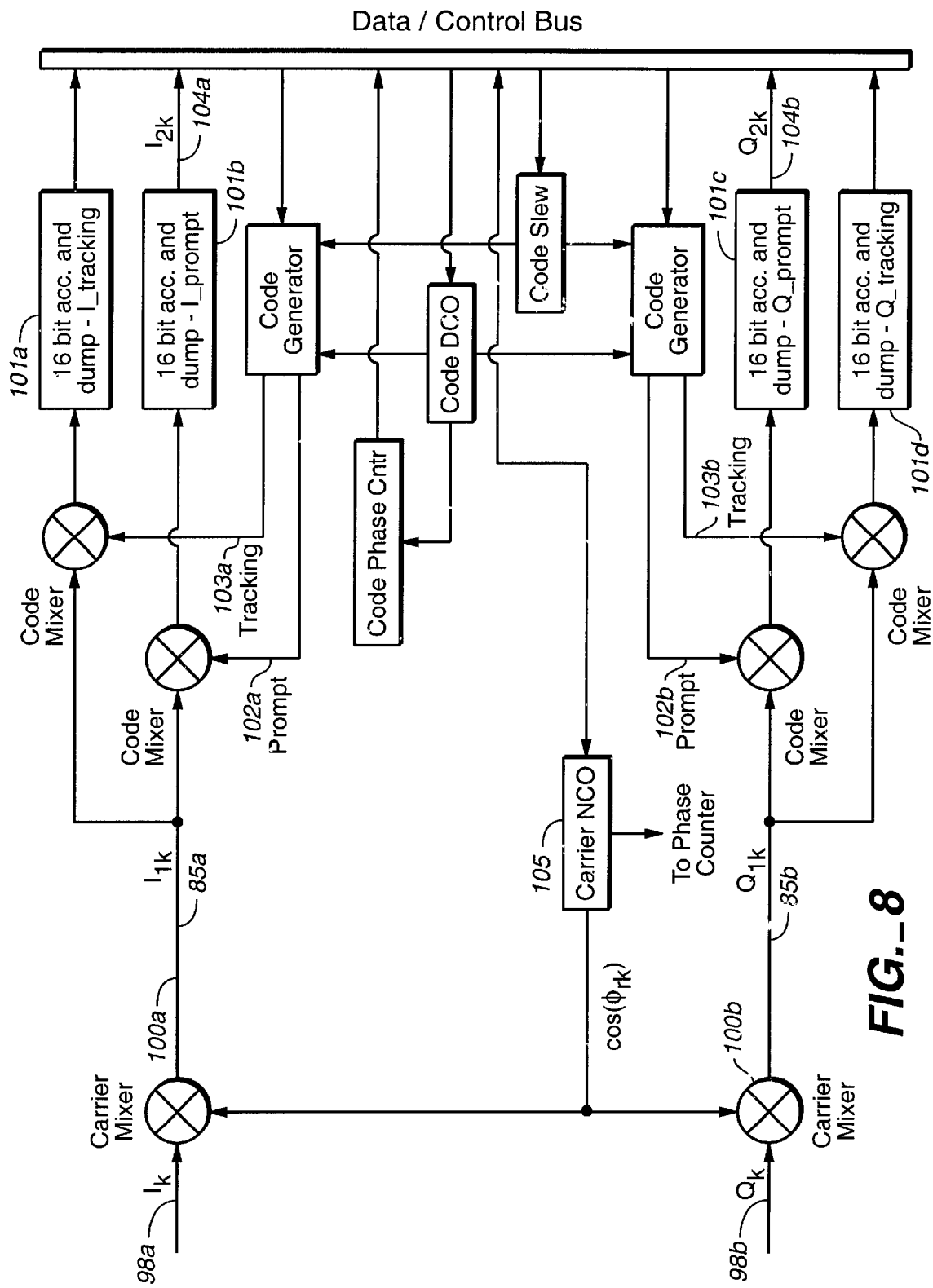
FIG._8

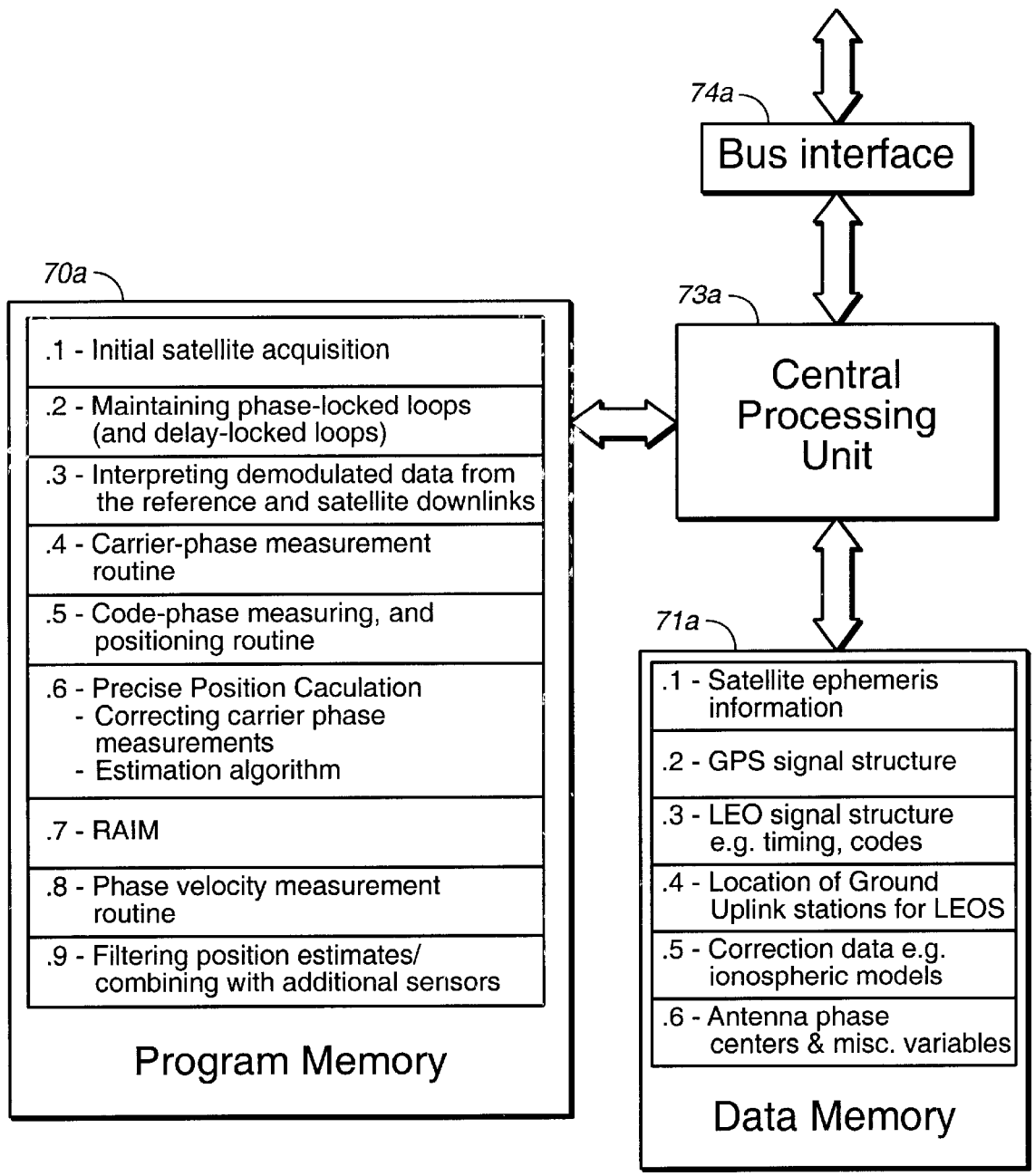
FIG._9

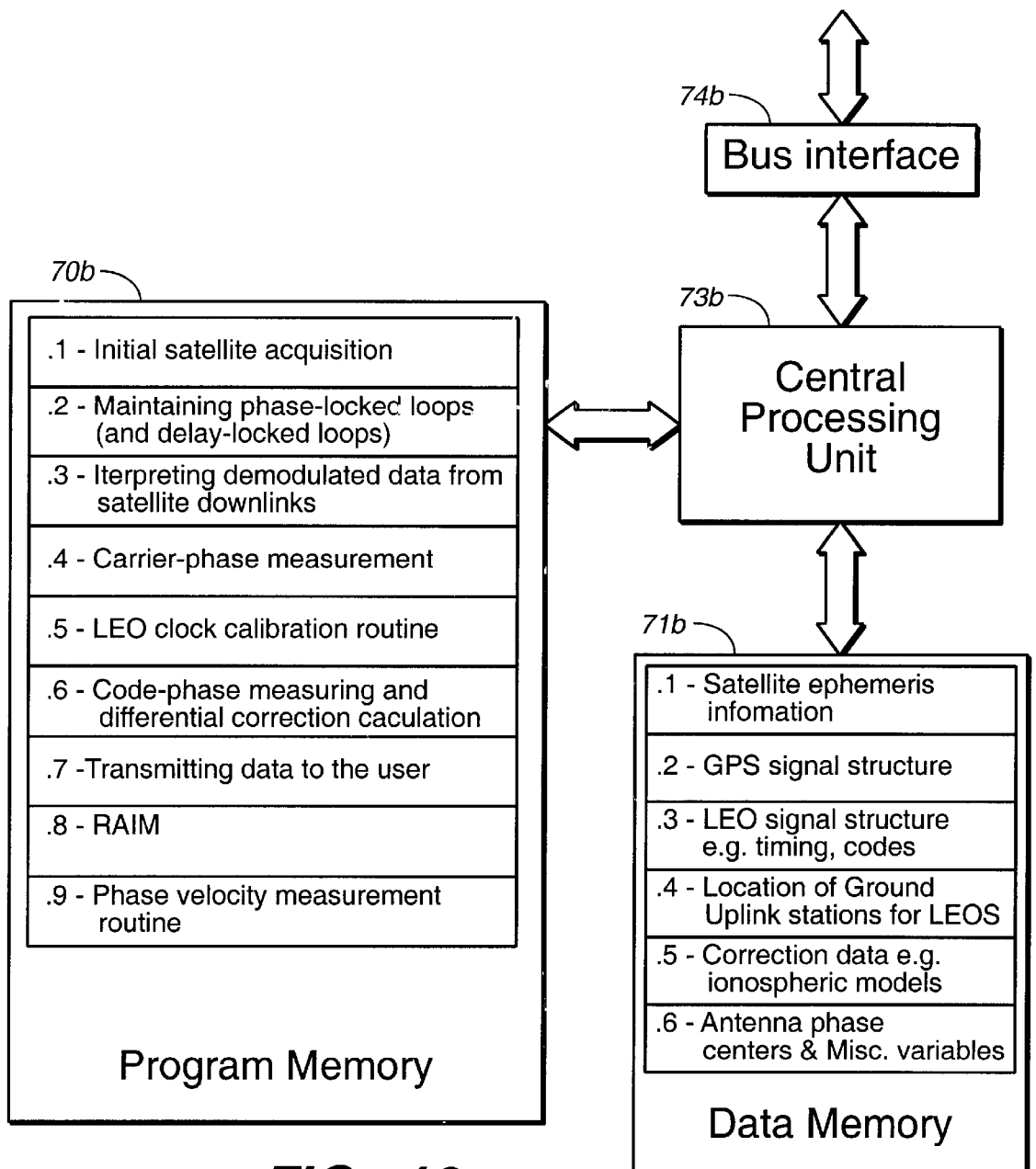
FIG._10

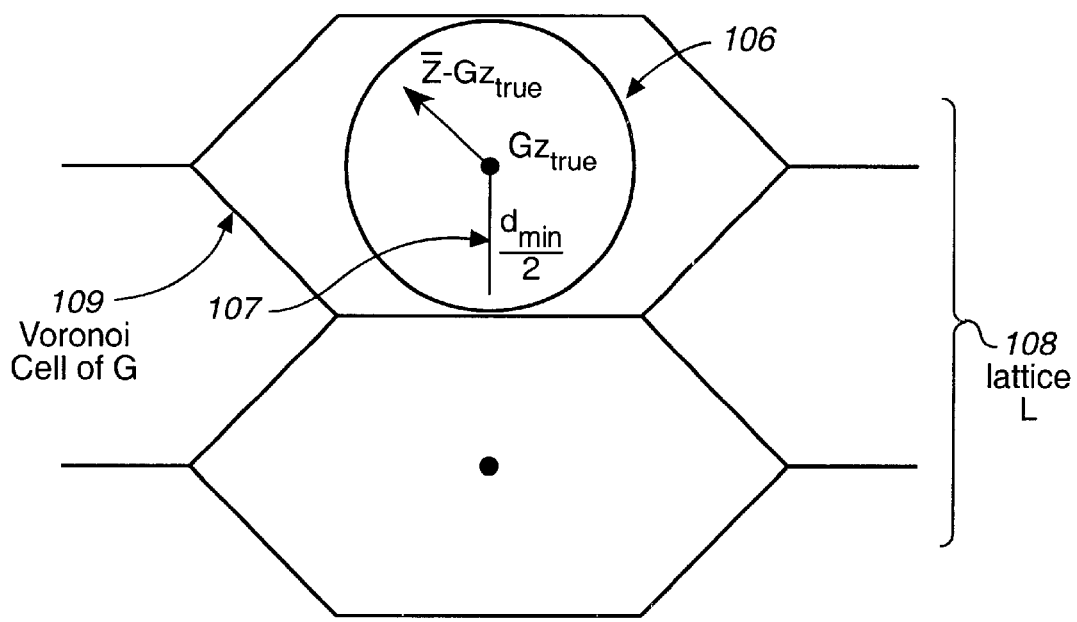
FIG._11
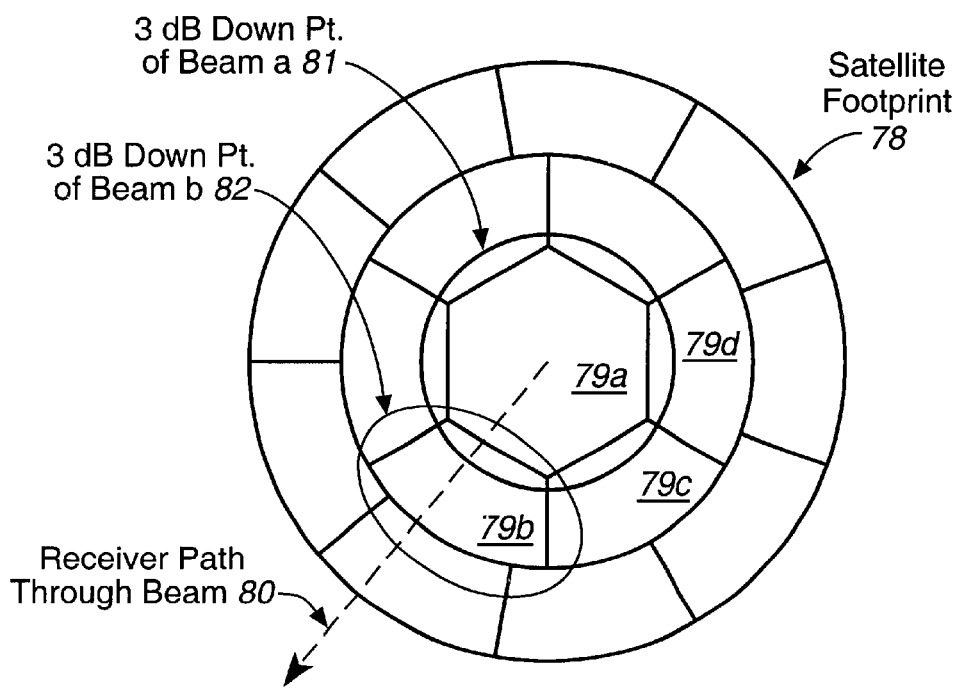
FIG._12

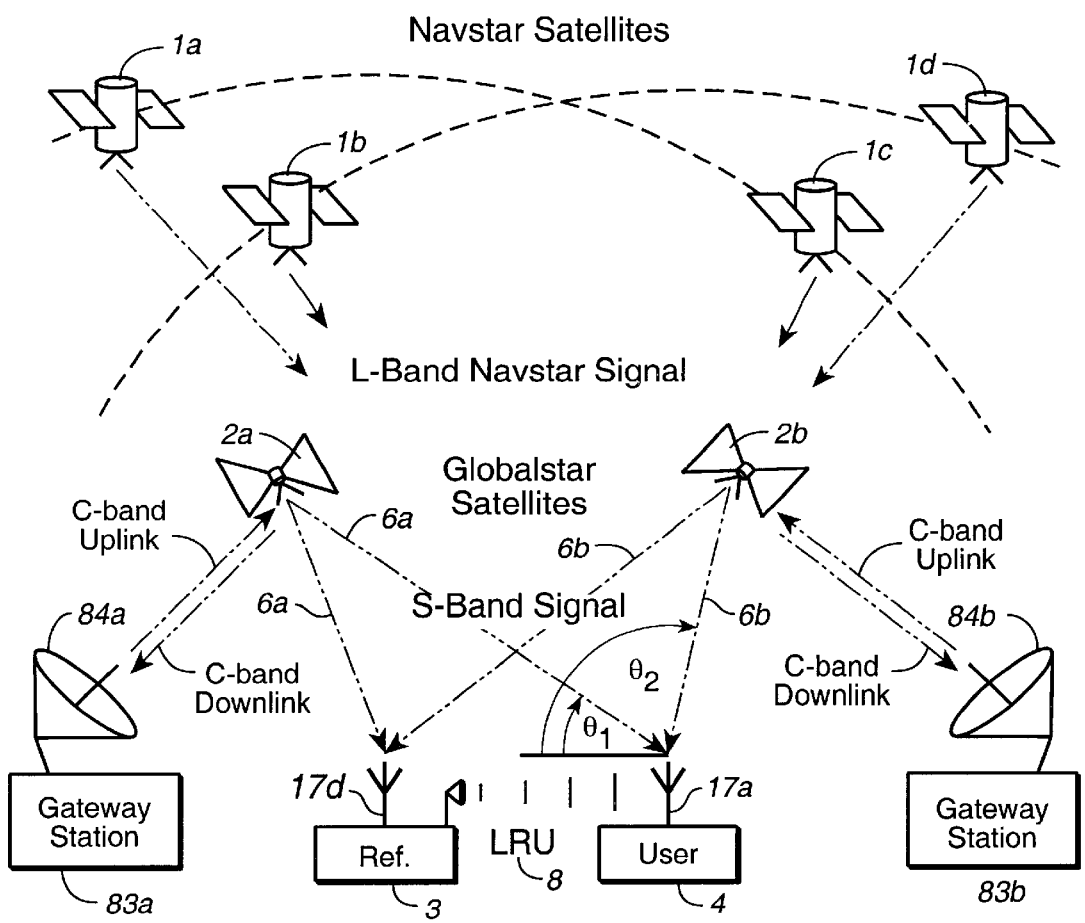
FIG._13

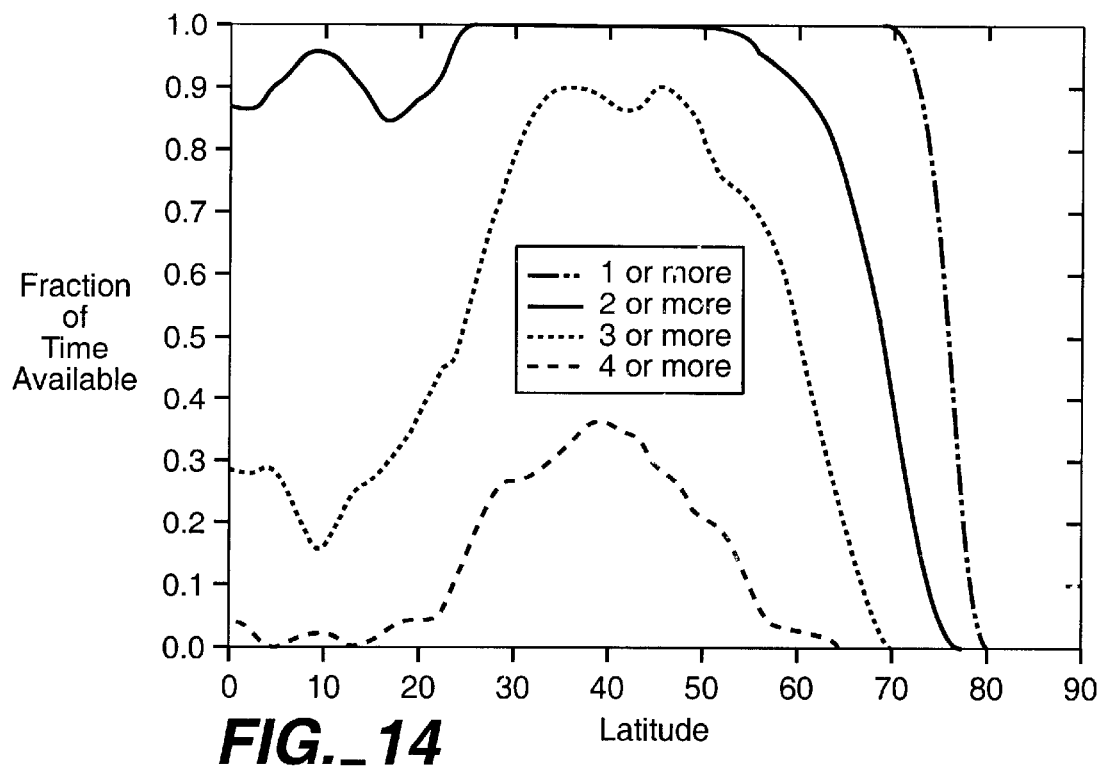
FIG._14
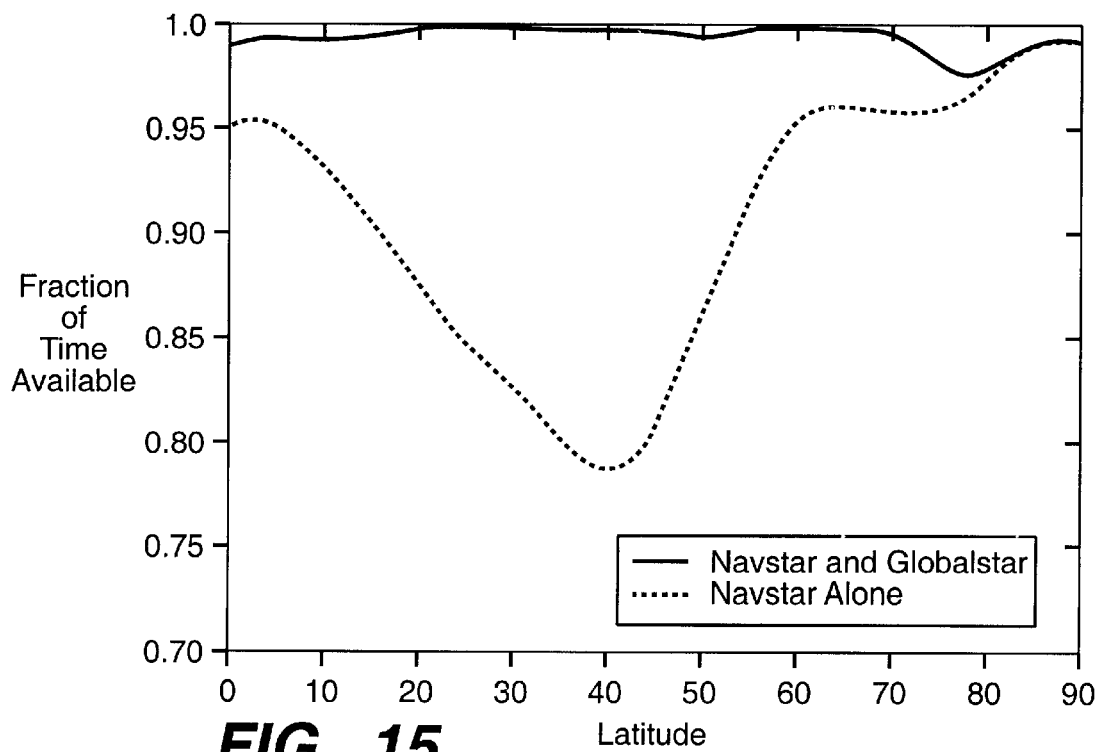
FIG._15

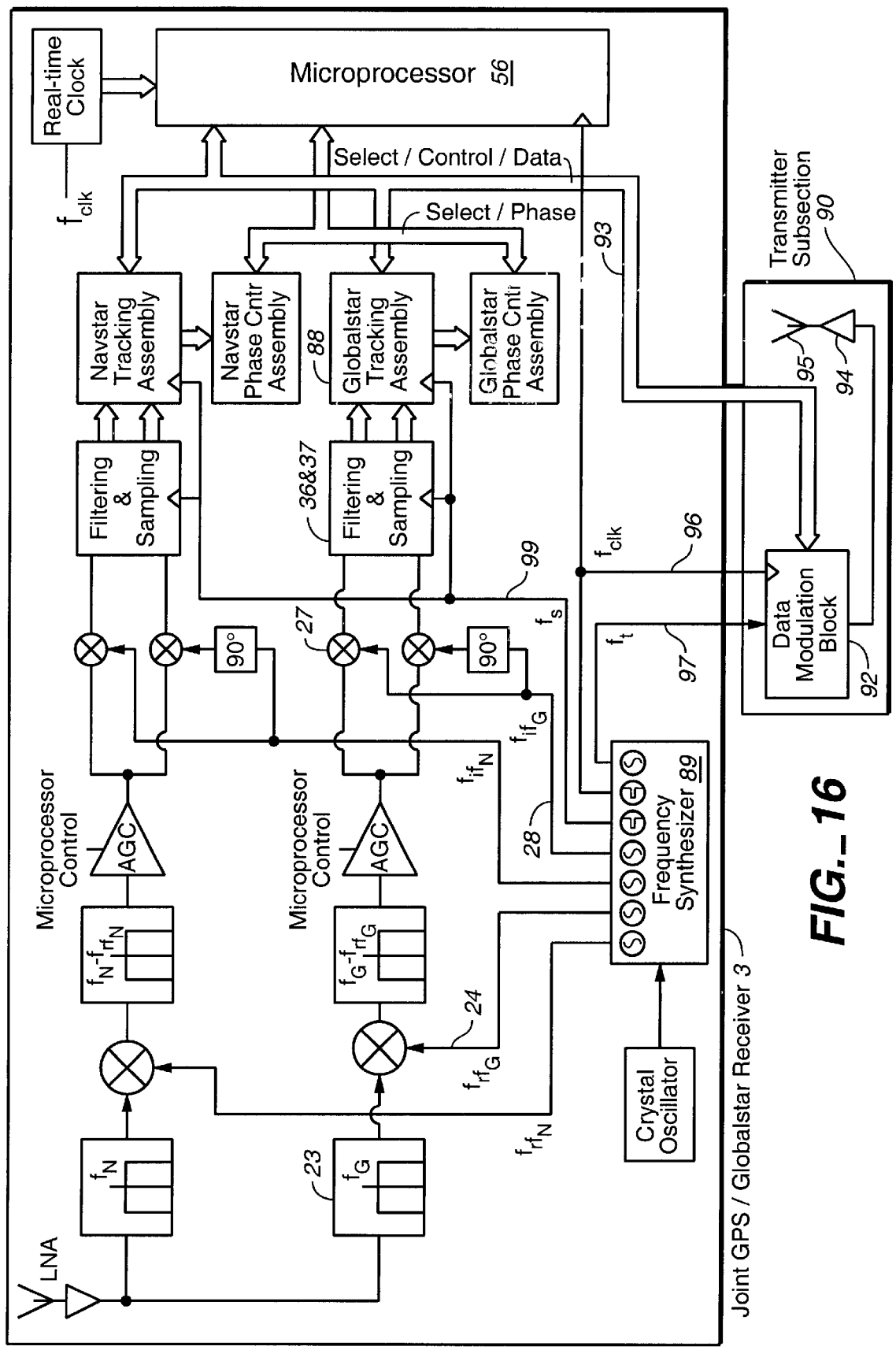
FIG._16

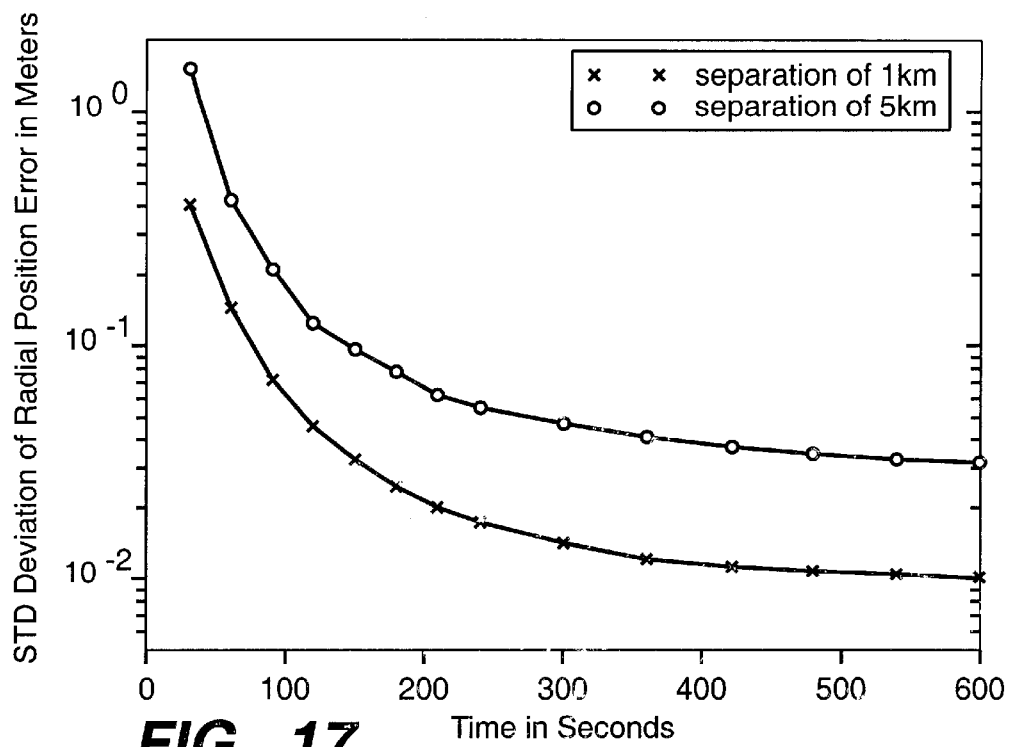
FIG._17
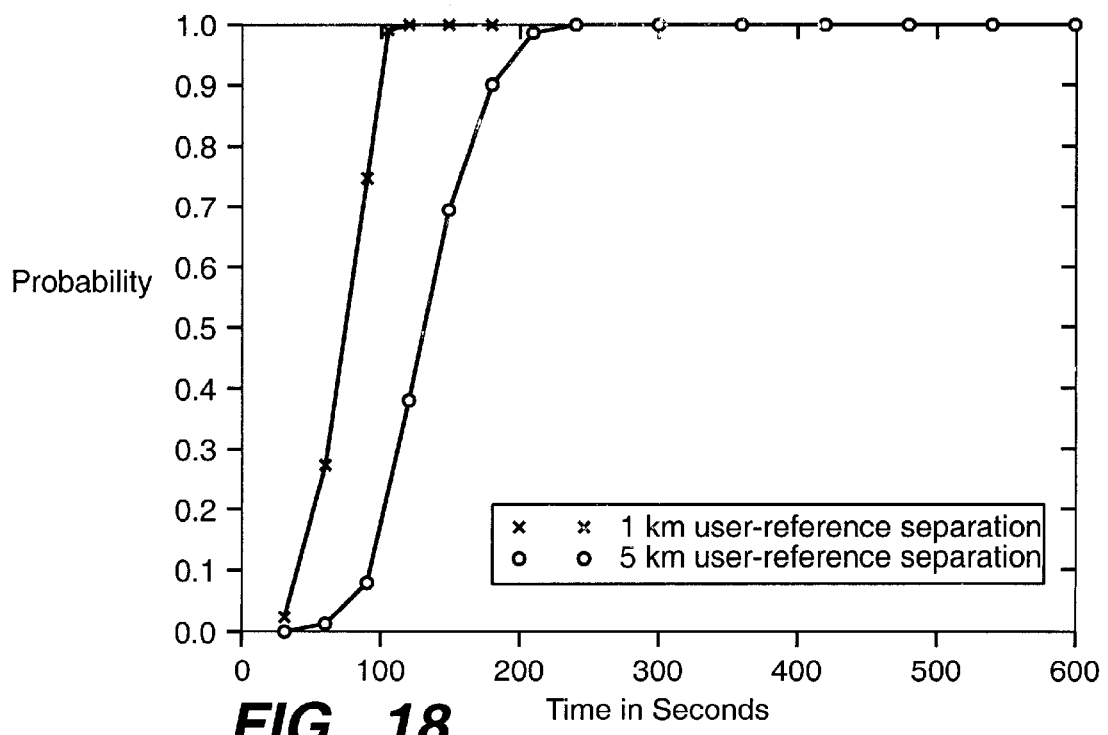
FIG._18

SYSTEM USING LEO SATELLITES FOR CENTIMETER-LEVEL NAVIGATION

I. CROSS-REFERENCE TO RELATED APPLICATIONS

This application is a continuation of U.S. patent application Ser. No. 09/287,523, filed on Apr. 7, 1999, now abandoned which is a continuation of U.S. patent application Ser. No. 09/167,520 filed on Oct. 6, 1998, now abandoned, which is a continuation of U.S. patent application Ser. No. 09/045,497 filed on Mar. 20, 1998, now abandoned, which is incorporated herein by reference, which claimed benefit of priority from U.S. Provisional Patent Application No. 60/041,184, filed Mar. 21, 1997.

This invention was reduced to practice with support from NASA under contract number NAS8-39225. The U.S. Government has certain rights in the invention.

II. BACKGROUND

Conventional satellite-based positioning techniques are based on the use of special navigation signals transmitted from several navigational satellites. In the global positioning system (GPS), for example, a constellation of GPS satellites transmit L1 and L2 carrier signals modulated with C/A and P code signals. By measuring these code signals, a user receiver can determine its position to an accuracy of several meters.

To determine the user position with higher accuracy, a differential technique can be used. A reference receiver having a known position also measures the code signals and calculates its position. The reference receiver then calculates a differential correction by comparing its known position with this calculated position, and transmits this correction to the user receiver. Assuming the user receiver is near the reference station, it can use the differential correction data to improve the accuracy of its position estimate down to approximately 1 meter.

Various proposed techniques provide positioning accuracy on the order of 1 cm. In addition to measuring the code signals from the GPS satellites, these techniques use carrier phase measurements of the signals from the GPS navigational satellites. Typically, this carrier phase positioning technique uses differential carrier phase correction data from a reference station in order to improve performance. There is a significant difficulty inherent to this technique, however. When tracking a carrier signal of a navigational satellite transmission, one is able to directly measure the phase of the signal, but one cannot determine by direct measurement how many complete integer cycles have elapsed between the times of signal emission and reception. The measured carrier signal thus has an inherent integer cycle ambiguity which must be resolved in order to use the carrier phase measurements for positioning. Consequently, much research in the art of satellite-based positioning has focused on resolving these cycle ambiguities in carrier phase measurements of GPS satellite signals.

MacDoran and Spitzmesser (U.S. Pat. No. 4,797,677) describe a method for deriving pseudoranges of GPS satellites by successively resolving integers for higher and higher signal frequencies with measurements independent of the integers being resolved. The first measurement resolves the number of C/A code cycles using a Doppler range; these integers provide for independent measurements to resolve the number of P code cycles, and so on for the L2 and L1 carriers. This technique, however, assumes exact correlation between satellite and user frequency standards (i.e., the user requires an atomic clock), and provides no means of correcting for atmospheric distortions.

A similar technique, called dual-frequency wide-laning, involves multiplying and filtering the L2 and L1 signals from a GPS satellite to form a beat signal of nominal wavelength 86 cm, which is longer than either that of the L1 signal (19 cm) or the L2 signal (24 cm). Integer ambiguities are then resolved on this longer wavelength signal. Since the L2 component is broadcast with encryption modulation, however, this technique requires methods of cross-correlation, squaring, or partially resolving the encryption. These techniques are difficult to implement and how low integrity.

Hatch (U.S. Pat. No. 4,963,889) describes a technique for resolving integer ambiguities using measurements from redundant GPS satellites. Initial carrier-phase data is collected from the minimum number of GPS satellites needed to resolve the relative position between two antennae. From these measurements, a set of all possible integer combinations is derived. Using carrier phase measurements from an additional GPS satellite, the unlikely integer combinations are systematically eliminated. This technique is suited to the context of attitude determination where both receivers use the same frequency standard and the distance between the antennae is fixed. This approach, however, is ill-adapted for positioning over large displacements, where the initial set of satellites is four and the distance between the receivers is not known a priori, the technique is then extremely susceptible to noise, and computationally intensive. Knight (U.S. Pat. No. 5,296,861) details an approach similar to that of Hatch, except that a more efficient technique is derived for eliminating unlikely integer combinations from the feasible set. Knight's technique also assumes that the two receivers are on the same clock standard.

Counselman (U.S. Pat. No. 5,384,574) discloses a technique for GPS positioning that does not resolve integer cycle ambiguity resolution but rather finds the baseline vector between two fixed antennae by searching the space of possible baseline vectors. The antennae track the GPS satellite signals for a period of roughly 30 minutes. The baseline is selected that best accounts for the phase changes observed with the motion of the GPS satellites. This technique, however, assumes that the baseline vector remains constant over the course of all the measurements during the 30 minute interval, and is therefore only suitable for surveying applications. Moreover, it also assumes that the clock offset between user and reference receivers remains constant over the 30 minute measurement interval.

A motion-based method for aircraft attitude determination has been disclosed. This method involves placing antennae on the aircraft wings and tail, as well as a reference antenna on the fuselage. The integer ambiguities between the antennae can be rapidly resolved as the changes in aircraft attitude alter the antenna geometry relative to the GPS satellite locations. This approach, however, is limited to attitude determination and is not suitable for precise absolute positioning of the aircraft itself.

Current state-of-the art kinematic carrier phase GPS navigation systems for absolute positioning have been disclosed. These systems achieve rapid resolution of cycle ambiguities using ground-based navigational pseudo satellites (pseudolites) which transmit either an additional ranging signal (Doppler Marker) or a signal in phase with one of the satellites (Synchrolites). Although this approach rapidly achieves high precision absolute positioning, it provides high precision and integrity only when the user moves near the ground-based pseudolites. In addition, the pseudolites are expensive to maintain.

Therefore, each of the existing techniques for satellite-based navigation suffers from one or more of the following drawbacks: (a) it does not provide centimeter-level accuracy, (b) it does not quickly resolve integer cycle ambiguities, (c) it is not suitable for kinematic applications, (d) it provides only attitude information and does not provide absolute position information, (e) it does not have high integrity, (f) it requires the deployment and maintenance of pseudolities, (g) its performance is limited to users in a small geographical area near pseudolities, or (h) it requires the user receiver and/or the reference receiver to have an expensive highly stable oscillator.

III. SUMMARY OF THE INVENTION

In view of the above, it is an object of the present invention to provide a system and method for centimeter-level kinematic positioning with rapid acquisition times and high integrity. In addition, it is an object of the invention to provide such a method that does not depend on additional signals transmitted from nearby navigational pseudolite transmitter, and does not require a highly stable oscillator such as an atomic clock. It is further an object of the invention to provide a navigation system requiring only carrier phase information. These together with other objects and advantages will become apparent in the following description.

In order to obtain high-integrity estimation of integer cycle ambiguities, carrier-phase measurements must be made for a time interval long enough that the displacement vectors between the user and the signal sources undergo substantial geometric change. Surprisingly, the present inventors have discovered a method and system for fast acquisition, high integrity, kinematic carrier-phase positioning using a non-navigational signals from low earth orbit (LEO) satellites which are not necessarily intended for navigational use. The short orbital periods of these LEO satellites provide the required change in geometry for resolution of cycle ambiguities with high reliability in a few minutes. The technique, therefore, provides fast acquisition, high precision and high integrity without depending on signals from ground-based pseudolites in close proximity to the user. In addition, the technique has the advantage that it does not require that the LEO satellites have any special features (e.g. atomic clocks or the ability to transmit navigational signals).

Remarkably, the present inventors have discovered a system and method for satellite-based navigation using signals from non-navigational satellites in low earth orbit. Beginning only with an estimate of the user clock offset, high precision kinematic positioning is provided using only carrier-phase signals transmitted from earth orbiting satellites. By using signals from at least one LEO satellite, high integrity and fast acquisition is provided. The other signals may be from other satellites, including high earth orbit navigational satellites, or from any other space-based or earth-based sources, including pseudolites and other earth-based transmitters. Only the carrier phase signals from these other sources are required.

In a preferred embodiment, an initial estimate of the user position and clock offset is provided by conventional code-phase differential GPS techniques. In addition, differential carrier phase measurements are used in order to eliminate errors caused by atmospheric phase distortion, satellite ephemeris deviations, and deliberate corruption of the satellite signals. As will become apparent, however, the fundamental technique of using non-navigational carrier signals from LEO satellites for resolving integer cycle ambiguities in a navigational system is not limited to these specific implementations. In alternative embodiments, for example, an initial clock offset may be estimated by any combination of known techniques for navigation, including anything from sophisticated earth-based radio navigation to simply calibrating the user receiver to a known reference.

In the preferred embodiment, centimeter-level positioning is provided by combining the navigational data available from GPS satellites with the non-navigational carrier phase data available from LEO satellites. In addition, the non-navigational carrier phase data from the GPS satellites is used. The method is robust to frequency-dependent phase-lags in the navigation receivers, as well as to instabilities in the crystal oscillators of the satellites, and of the receivers. We describe how the general technique can be applied to a variety of different satellite communication configurations. Such configurations include satellite transmission of multiple beams with different phase-paths, and bent-pipe architectures where the uplink signal is frequency-converted by the satellite and retransmitted.

Generally, in one aspect of the invention a user device is provided for satellite-based navigation. The device comprises at least one antenna for coupling to signals transmitted from a set of satellites. The set of satellites includes a set of LEO satellites that do not necessarily transmit navigational information. A receiver in the device tracks the signals to obtain carrier phase information comprising geometrically diverse carrier phase information from the LEO satellites. A microprocessor in the device calculates the precise position of the user device based on the carrier phase information and an initial estimate of the device clock offset. In a preferred embodiment, the device calculates an initial estimate of position and clock offset from code phase information derived from navigational signals transmitted by navigational satellites. In addition, the preferred embodiment uses reference carrier phase information transmitted from a reference station to improve the accuracy of the position estimate.

In another aspect of the invention, a satellite-based navigation system is provided. The system comprises a set of satellites, including LEO satellites, that transmit carrier signals, a reference station, and a user device. The reference station samples the carrier signals to obtain reference carrier phase information which is then transmitted to the user device over a communication link. In addition to receiving the reference carrier phase information, the user device directly tracks the carrier signals to obtain user carrier phase information from the set of LEO satellites. The user device then calculates its precise position based on the reference carrier phase information and the user carrier information. The calculation uses the geometrically diverse reference and user carrier information from the LEO satellites to quickly resolve parameters related to the integer cycle ambiguities in the reference and user carrier phase information. In a preferred embodiment, the calculation of the user position is based on an initial estimated clock offset and position calculated from navigational code phase signals transmitted from a set of navigational satellites. Preferably, the reference station also transmits differential code phase correction data to the user to improve the accuracy of the initial estimate.

In another aspect of the invention, a method is provided for estimating a precise position of a user device in a satellite-based navigation system. The method comprises transmitting carrier signals from a set of satellites, wherein the set of satellites includes a set of LEO satellites; tracking at a user device the carrier signals to obtain user carrier phase information comprising geometrically diverse user carrier phase information from the set of LEO satellites; and calculating the precise position of the user device based on an initial position estimate and the user carrier phase information, wherein the calculation uses the geometrically diverse user carrier information from the set of LEO satellites to quickly resolve integer cycle ambiguities in the user carrier phase information. In a preferred embodiment, the method includes tracking at a reference station the carrier signals to obtain reference carrier phase information comprising geometrically diverse reference carrier phase information from the set of LEO satellites. The reference carrier phase information is then used to improve the accuracy of the position calculation. In a preferred embodiment, the method further comprises estimating an approximate user position and clock offset using code phase signals received from a set of navigational satellites. Preferably, differential code phase techniques are used to improve the accuracy of the initial estimate. The preferred embodiment of the method also includes additional advantageous techniques such as: compensating for frequency dependent phase delay differences between carrier signals in user and reference receiver circuits, reading navigation carrier information and LEO carrier information within a predetermined time interval selected in dependence upon an expected motion of the user receiver and the LEO signal sources, calibrating LEO oscillator instabilities using navigation satellite information, compensating for phase disturbances resulting from a bent pipe LEO communication architecture, compensating for oscillator instabilities in the user and reference receivers, predicting present reference carrier phase information based on past reference carrier phase information, and monitoring the integrity of the position calculation.

IV. BRIEF DESCRIPTION OF THE FIGURES

FIG. 1 shows an operational overview of a preferred embodiment of the invention.

FIG. 2 shows some possible methods of conveying the LEO ephemerides to the user in a system according to the invention.

FIG. 3 shows a receiver architectural overview according to a preferred embodiment of the invention.

FIGS. 4a and 4b show two different mixing, filtering and sampling schemes according to a preferred embodiment of the invention.

FIG. 5 shows tracking and phase counting assemblies for the mixing scheme of FIG. 4a, according to a preferred embodiment of the invention.

FIG. 6 shows tracking and phase counting assemblies for the mixing scheme of FIG. 4b, according to a preferred embodiment of the invention.

FIG. 7 shows tracking and phase counting assemblies for the mixing scheme of FIG. 4b, and a phase latch architecture, according to a preferred embodiment of the invention.

FIG. 9 shows a microprocessor block diagram for a user receiver according to a preferred embodiment of the invention.

FIG. 10 shows a microprocessor block diagram for a reference receiver according to a preferred embodiment of the invention.

FIG. 11 is a conceptual illustration of lattice points defined by a lattice basis G in accordance with a preferred embodiment of the invention.

FIG. 12 shows the beam arrangement for the Globalstar S-band downlink.

FIG. 13 shows the operational overview of a method using Globalstar satellites according to a preferred embodiment of the invention.

FIG. 14 is a graph of the fractional availability of the Globalstar Constellation above 10° elevation.

FIG. 15 is a graph of the availability of RAIM for protection radii of 110 cm, assuming GPS alone and GPS augmented with Globalstar, according to a preferred embodiment of the invention.

FIG. 16 shows a reference receiver and transmitter architectural overview in accordance with a preferred embodiment of the invention.

FIG. 8 is a block diagram of one channel of a tracking module designed for the CDMA signal of equ. (1), according to a preferred embodiment of the invention.

FIG. 17 is a graph of average standard deviations in radial position errors for a mobile user, at 5 km and 1 km from the reference station, according to a preferred embodiment of the invention.

FIG. 18 is a graph of the evolution of the Probability of Selecting the Correct Integer Set, in accordance with a preferred embodiment of the invention.

V. DETAILED DESCRIPTION

For the purposes of this description, we assume that an initial estimate of position and clock offset is derived satellite navigational signals and that the navigation satellites employed are the Navstar satellites of the GPS constellation. It will be appreciated that other present or future navigation satellites may be used in other embodiments of the invention and other navigation techniques may be used to estimate an initial position and clock offset. We assume also the use of differential techniques involving a single reference receiver and a single user receiver which requires real-time position information. It will be apparent, however, that these differential techniques are not necessary in order to practice the invention.

FIG. 1 presents a schematic overview of the system. The central components of the system are the Navstar GPS satellites 1a–d, the LEO satellites 2a,b, the user receiver 4 and the reference receiver 3. The user 4 and reference 3 receivers track the absolute carrier phase of the Navstar satellite signals 5a–d together with the absolute carrier phase of multiple LEO satellite signals 6a,b. By the term absolute, we mean the phase measurement is accumulated over time and is not modulus $2\pi$. The motion of the LEOS 2a,b causes rapid change in the angles—shown in the figure as $\theta_1$ and $\theta_2$—between the baseline 7 from user antenna 17a to reference antenna 17d, and the line of site vectors from user antenna 17a to satellites 2a,b. The rapid change in the line-of-sight vectors enables the user receiver 4 to resolve the integer cycle ambiguities on the Navstar satellite signals 5a–d as well as parameters related to the integer cycle ambiguities on the LEO signals 6a,b, and consequently to position itself with cm-level precision with respect to the reference receiver 3.

We describe below the steps involved in the general technique. It would be clear to one skilled in the art how the order of these steps would change, or how some steps would be adjusted for a static user, or an attitude determination problem where use and reference receivers are driven by a common oscillator and are separated by a constant distance.

The reference 3 and user 4 receiver obtain up-to-date satellite ephemeris information.

Both reference 3 and user 4 receiver measure the code phase delay on the signals 5*a–d* transmitted by the GPS satellites. This measurement is known in the art as raw pseudorange.

Based on the code phase measurement, the user 4 and reference 3 correlate their clocks to within 1 μsec of GPS time.

In a preferred embodiment, the reference receiver 3 calculates differential corrections for the code-phase measurements and conveys them to the user receiver 4 over a communication link 8. The user receiver 4 then positions itself with meter-level accuracy relative to the reference receiver 3 using the differentially corrected code-phase measurements.

The user 4 and reference 3 receiver simultaneously track the absolute carrier phase of GPS satellite signals 5*a–d* and LEO satellite signals 6*a,b* over an interval of time.

If necessary, the reference receiver calibrates the LEO satellite oscillators using the technique described in section (VII.C).

The reference receiver 3 conveys to the user its carrier phase measurements and measurement correction data over the communication link 8.

The user corrects for deterministic errors in the carrier phase measurement.

The user employs the data-reduction technique described in section (VI.B) to identify the integer cycle ambiguities on the Navstar satellites signals 5*a–d,* and parameters related to the integer cycle ambiguities on the LEOS signals 6*a,b*.

Once these parameters are identified, the user receiver 4 is able to position itself in real time, with centimeter-level accuracy relative to the reference receiver 3.

V.A. Data Links in the System which have Many Possible Implementations.

V.A.1 Communicating the LEO Satellite Ephemerides

The navigation capability of the system hinges on the user knowing the location of the LEOS 2*a,b* to reasonably high accuracy—see section (VIII.D). Knowledge of the satellite position as a function of time can be obtained via the satellite ephemeris data. This ephemeris data consists of several parameters for each satellite, describing the satellite orbit and changes in that orbit over time. To maintain the desired levels of accuracy, the ephemeris data must be updated by the user roughly daily. FIG. 2 displays the different mechanisms by which the ephemeris data may be conveyed to the user. Any sequence of arrows leading from the satellite operations and control center—SOCC 9, or tracking station 10 to the user 4*a–c* is possible. The position sensing for the ephemeris data can be achieved either by position sensors on the satellites 2*a–c,* such as GPS receivers, or by a tracking station 10 processing Doppler information from ground receivers at surveyed locations to calculate the LEOS' 2*a–c* orbital parameters. Whether the information is attained from the SOCC 9, or from a separate tracking station 10, the data is conveyed to an ephemeris data provide 11 who must make the information accessible to the user 4*a–c.* A simple implementation connects the reference 3 to the ephemeris provider 11 via line modems 12*a,c* over a regular land telephone line 12*b.* Alternatively, the information can be obtained by the reference over a LEO satellite data link 13*a–b.* The reference would then convey this information to the user 4*a–c* via a data Link from Reference to User—LRU 8. Another embodiment has the LEO satellite 2*b* broadcasting ephemeris data 14*a—e* on a dedicated broadcast channel 14*b–e* which is received by both the reference 3 and the users 4*a–c.* The techniques for deriving ephemeris data from satellite position sensors, or from Doppler-tracking satellites, are well understood in the art, as are the implementations of these different methods for conveying that information to the user.

V.A.2 The data Link from Reference to User (LRU)

For a mobile user, the LRU 8 is implemented with a real-time radio connection 15*a–d.* For an attitude determination problem, the LRU 8 could be implemented with a real-time cable connection, and for static surveying applications, the LRU could be off-line. For the mobile user the LRU 8 will be implemented using the same basic frequency and modulation scheme of either the GPS signals 5*a–d,* or the LEO satellite signals 6*a,b.* In this way, existing receiver front-end hardware—see FIG. 3—can be used for the LRU 8. The radio LRU could be implemented by transmitting a signal 15*a,b* directly to the user 4*a,b* via a reference station transmitter 16, or by using an existing LEO satellite data link 15*c,d.*

The central function of the LRU 8 is to convey carrier phase measurements made at the reference station 3 to the user 4. If the user receiver 4 knows the location of the reference station 3, it is able to accurately predict the phase measurements that the reference receiver 3 will make for up to a few seconds. Consequently, the LRU 8 needs to be active every few seconds over the duration of navigation. In addition to the carrier phase information, the LRU 8 can convey to the user 4:

The satellite ephemerides. This would be necessary for an implementation where the ephemeridies are not known to the user, and cannot be obtained by a directly broadcast satellite data link 14*a–e.*

An estimate of the reference receiver's clock offset. This can be used to correct the differential measurement as described in section (VI.A).

Differential corrections for code-phase measurement. In order to achieve an initial differential position estimate which is accurate to within meters, the reference 3 would send to the user 4 a set of corrections for the range measurements to improve the code phase performance of GPS. The technique of deriving these corrections is well understood in the art.

The position of the reference station antenna 17*d.* The data reduction technique depends upon the user knowing the rough location of the reference station antenna. The user receiver 4 finds the centimeter-level position between its antenna 17*a–c* and the reference receiver antenna 17*d.* Therefore, the universal accuracy of the user's derived position depends on the reference antenna 17*d* position information.

Status information on the satellites 1*a–d,*2*a–c.* The reference station can also send the user information about the health and signal characteristics of each of the satellites being tracked.

Error correction information. This information is employed by the user to minimize the residual errors of differential phase measurement, due for example to ionospheric and tropospheric delays, and sever satellite oscillator instabilities.

V.B. Description of a combined GPS and LEO receiver

FIG. 3 illustrates the essential components for a reference 3 or a user 4 receiver, assuming that transmission are receivable from the Navstar Constellation (N) as well as LEO constellations ($L_1, L_2, L_3$). Only one LEO constellation is necessary for the invention, however 3 LEO constellations are assumed for this diagram in order to illustrate the scaleable nature of the invention. While the overall structure of this receiver cannot be substantially altered, it should be recognized that the individual modules identified in FIG. 3 can be implemented in a variety of ways.

The antennae subsystem 17 must be sensitive to the downlink bands of each constellation being tracked. We assume in our description of the data reduction technique that the antenna subsystem consists of a single antenna which is resonant at the relevant frequencies and has phase centers 21a–d for the respective bands which are separated by only a few millimeters. This assumption simplifies the description, but is not essential to the invention. If an antenna subsystem is used with phase centers which are substantially separated for the different frequencies, the relative position of the phase centers would simply be used to correct the carrier phase measurements—equ. (13)—to take this separation into account. This would involve either assuming an orientation of the antenna subsystem 17, or for attitude-determination problems, iteratively making the correction based on the estimated orientation of the vehicle on which the antenna subsystem is mounted.

The antenna feeds a low noise amplifier (LNA) 22 which has gain over the full bandwidth of the signals being tracked. Of course, separate LNA's could be used for each of the constellations being tracked, namely on the N, L1, L2 and L3 paths 18, 19a–c respectively. We will examine the receiver path for one of the constellations, L1 19a, since all paths are similar at this level of description. The signal from the LNA 22 is bandpass filtered with an $rf$ bandpass filter 23 and then downconverted by mixing with a locally generated $rf$ frequency $f_{rf_{L1}}$ 24. An $if$ bandpass filter 25b at the mixer 26b output removes the unwanted upper sideband. A microprocessor-controlled automatic gain control 29 then adjusts the magnitude of the signal to achieve optional use of the available sampling bits. For a situation where a signal is hidden in bandpass noise substantially larger power— such as arises with spread spectrum modulation methods— the SNR forfeited by sampling with one bit is roughly 1.96 dB. Therefore, it is possible to implement this system with only one bit, in which case the controllable gain of the AGC is unnecessary. Another potential variation on this architecture is to place a low noise AGC at the input to the rf bandpass filter 23,30–32 for each of the receiver paths, to substitute for the LNA 22 and AGC's 29,33–35.

After amplification by the AGC 29, the signal 53 enters an if mixing stage 27, followed by a filtering stage 36 and a sampling stage 37. The signal is mixed in an if mixer 27 with a locally generated $if$ frequency $f_{if_{L1}}$ 28. The exact means of downconverting, filtering and sampling the signal at the $if$ stage varies substantially with the signal structure and designer's preference. FIGS. 4a and 4b illustrate two possible means of implementing the $if$ mixing, filtering and sampling. Both of these schemes would be possible for Binary-Phase-Shift-Keyed (BPSK) and Quadrature-Phase-Shift-Keyed (QPSK) signals. In the scheme of FIG. 4a, only a single mixer 40 and filter 41 are used, and the sampling section 42 outputs a single sample 43. If the incoming signal 53 had quadrature modulation, FIG. 5 describes a possible architecture for a tracking assembly 44b preceded by the scheme of FIG. 4a. The tracking modules 48a–c could mix the incoming signal 43 with both an in-phase and quadrature component of the output of the Numerically Controlled Oscillators 49a–c, in order to isolate the in-phase and quadrature modulation. In the scheme of FIG. 4b, both an in-phase 45a and quadrature 45b mixer are used, each of which outputs to a separate filter 46a,b and sample 47a,b. If the incoming signal 53 has quadrature modulation, FIG. 6 describes a possible architecture for a tracking assembly 44b preceded by the scheme of FIG. 4b. The tracking modules 52a–c of the tracking assembly could mix the incoming I 50a and Q 50 b signals with a single in-phase output of the Numerically Controlled Oscillator 51a–c to isolate the in-phase and quadrature modulation.

The bandwidth of the filters 41, 46a,b is chosen to accommodate the full bandwidth of the signal tracked, which is shifted by the offset $f_o = f_{L1} - f_{rf_{L1}} - F_{if_{L1}}$. These filters 41, 46a,b could be lowpass or bandpass, depending on $f_o$. The sampling rate should be roughly 5 to 10 times the highest frequency component in the signal and the number of bits sampled could vary from 1 to 16 bits, depending on the signal structure, the SNR, the desired robustness to interference, and hardware costs.

Since the tracking assemblies of FIG. 5 and 6 have essentially similar structure, we will consider in more detail only the architecture displayed in FIG. 6. We assume the $if$ mixing is performed using the scheme of FIG. 4b. The thick black lines represent digitized I 50a and Q 50b samples. The incoming samples are latched 72a, 72b and input to S tracking modules, where S is the maximum number of signals from a particular satellite constellation that one seeks to track. Each tracking module 52a–c tracks one satellite downlink signal by means of a phase-locked loop. Many different techniques for implementing the tracking modules 52a–c are known in the art. Whichever tracking module architecture is employed, it involves an oscillator which is phase-locked to the phase of the incident signal. The preferred embodiment employs a numerically controlled oscillator 51a–c in the phase locked loop. In order to analyze phase-tracking behavior, we present one possible design of a tracking module for generic CDMA signal of the form $$s(t) = \frac{A}{\sqrt{2}} D(t) C_I(t) \cos(\omega t + \phi(t)) + \frac{A}{\sqrt{2}} D(t) C_Q(t) \sin(\omega t + \phi(t)) + n(t) \qquad (1)$$

where D(t) refers to the outer data sequence modulated on both the in-phase and quadrature signals. $C_I(t)$ and $C_Q(t)$ are respectively the in-phase and quadrature spreading sequences. n(t) Represents thermal input noise, which is assumed to be normally distributed, of zero mean and of uniform spectral density $N_o$. A tracking module designed for the signal structure of equ. (1) is illustrated in FIG. 8. Ignoring the effort of front-end gains equally applied to signal and noise, the in-phase 98a and quadrature 98b digital signal entering the tracking module can be described:

$$I_k = \frac{A}{\sqrt{2}} D_k C_{Ik} \cos(\phi_k) + I_{nk} \qquad (2)$$

$$Q_k = \frac{A}{\sqrt{2}} D_k C_{Qk} \cos(\phi_k) + Q_{nk}$$

$$E\{I_{nk}^2\} = E\{Q_{nk}^2\} = \frac{N_0 B_c}{2}$$

where $B_c$ is the pre-correlation signal bandwidth, determined by the filters 46a,b. The upper sideband emerging from the carrier mixers 100a,b has frequency~$2f_0$ and is rejected by the accumulator 101a–d which has effective bandwidth 1/T, where T is the period of the inner codes $C_I(t)$ and $C_Q(t)$. Consequently, we consider only the lower sideband of the mixer outputs 85a,b:

$$I_{1k} = \frac{A}{\sqrt{2}} D_k C_{Ik} \cos(\phi_k - \phi_{rk}) + I_{1nk} \tag{3}$$

$$Q_{1k} = \frac{A}{\sqrt{2}} D_k C_{Qk} \cos(\phi_k - \phi_{rk}) + Q_{1nk}$$

$$E\{I_{1nk}^2\} = E\{Q_{1nk}^2\} \approx \frac{N_0 B_c}{2}$$

Each of these signals is then mixed with a prompt inner code 102a,b and a tracking inner code 103a,b, which consists of the difference between early and late code replicas, separated by some number of chips, d, where d<2. The prompt accumulator 101b,c outputs can be described:

$$I_{2i} = \frac{A}{\sqrt{2}} R(\tau_i) D_i \sum_{k=1}^{M} \cos(\phi_k - \phi_{rk}) + I_{2ni} \tag{4}$$

$$Q_{2i} = \frac{A}{\sqrt{2}} R(\tau_i) D_i \sum_{k=1}^{M} \sin(\phi_k - \phi_{rk}) + Q_{2ni}$$

$$E\{I_{2ni}^2\} = E\{Q_{2ni}^2\} \approx \frac{MN_0}{2T_c}$$

where $R(\tau_i)$ is the cross correlation between the incoming code and the generated code for a time misalignment of $\tau_i$. $R(\tau)\approx 1$ once code-lock is achieved. For an inner code period, T, and sample rate $f_s$, the summation is typically over $M=T^*f_s$ samples. This number may be varied to accommodate code Doppler. Assume that over one correlation period, T, the NCO 105 suffers a constant frequency error, $\Delta f_i \ll 1/T$, and a constant phase error, $\Delta \phi_i$. We can then treat the summation in equ. (4) as a continuous integral, and find $$E\{I_{2i}\} \approx \frac{A}{\sqrt{2}} D_i \mathrm{sinc}(2\pi \Delta f_i T) \cos(\Delta \phi_i) \tag{5}$$

$$E\{Q_{2i}\} \approx \frac{A}{\sqrt{2}} D_i \mathrm{sinc}(2\pi \Delta f_i T) \sin(\Delta \phi_i)$$

For an assumed orbital altitude of 1400 km and transmissions in the S-band, we expect a maximum phase acceleration due to Doppler of ~100.2π rad/s². For T=1 ms, we expect sinc(2π$\Delta f_i$)>0.97 so the factor can be safely dropped. The samples 104a,b are input to the microprocessor 56 which estimates the phase error and implements a loop filter to achieve desired phase-lock loop performance. Since the signal of equ. (1) has a common outer data sequence 86 on the in-phase and quadrature components, a simple Costas Loop discriminator approximates the phase error by multiplying the samples 104a,b.

$$\delta\phi_i = I_{2i} Q_{2i} \tag{6}$$

$$E\{\delta\phi_i\} = \frac{A^2 M^2}{2} \Delta\phi_i$$

From equ. (6), we see that the gain of the discriminator is $$K = \frac{A^2 M^2}{2}.$$

In addition, the variance of the discriminator output can be computed.

$$\sigma_{\delta\phi}^2 = E\{I_{2i}^2 Q_{2i}^2\} - E^2\{I_{2i} Q_{2i}\} \tag{7}$$

$$= \frac{K^2 N_0}{A^2 T}\left(1 + \frac{N_0}{A^2 T}\right)$$

By monitoring the signal amplitudes of the correlator outputs 104a,b, and varying the loop control accordingly, a specific phase-lock loop transfer function, H, is maintained by the microprocessor 56. Generally, in selecting the bandwidth of the loop, a tradeoff must be made between rejecting thermal noise on the one hand, and tracking performance on the other. For loop transfer function H, the NCO phase error, which we cannot directly estimate by the technique described in section (VI.B), has variance $$\sigma_\phi^2 \approx \frac{S_n(0)}{K^2} \frac{1}{2\pi} \int_{-\infty}^{\infty} |H(j\omega)|^2 \, d\omega + \frac{1}{2\pi} \int_{-\infty}^{\infty} S_o(\omega) |1 - H(j\omega)|^2 \, d\omega \tag{8}$$

where $S_n(0)$ is the power spectral density near the origin of the thermal noise. The expression assumes that the loop bandwidth, $$B_L \stackrel{\Delta}{=} \frac{1}{2\pi} \int_0^\infty |H(j\omega)|^2 \, d\omega,$$

is much smaller than $B_c$. Since the correlator bandwidth, $$\frac{1}{T},$$

is also much less than $B_c$, we can safely approximate $S_n(0) = T\sigma 2/\delta\phi$. From equ. (7), the phase error variance in equ. (8) becomes $$\sigma_\phi^2 = \frac{2N_0 B_L}{A^2}\left(1 + \frac{N_0}{A^2 T}\right) \tag{9}$$

This thermal noise variance is not heavily dependent on there being the same data sequence, $\{D_1\}$, on in-phase and quadrature signal components. For example, for a CDMA signal with QPSK data modulation, we would use a fourth-power loop, rather than the Costas Loop. It has been shown that thermal noise variance could then be approximated $$\frac{2N_0 B_L}{A^2}\left[1 + 3.8\left(\frac{N_0}{A^2 T}\right) + 7.6\left(\frac{N_0}{A^2 T}\right)^2 + 8\left(\frac{N_0}{A^2 T}\right)^3\right].$$

A phase-counter 57a–c keeps track of the absolute phase of the NCO 51a–c locked to each signal. The phase measurement of the phase counter 57a–c contains both a fractional and an integer component, where each integer refers to a full 2π phase cycle. There are multiple different means by which the microprocessor 56 can read the phase of the phase counters 57a–c. Whichever method is employed, for each reading epoch, the time from reading the first phase counter tracking a signal to the last phase counter tracking a signal should span an interval less than a few μsec in order to cause errors below the experimental noise floor. This specification is made concrete in section (VI.A). One method of satisfying this specification is illustrated in FIG. 6. The microprocessor 56 sequentially reads the phase of each tracking module that is locked on a signal. This is achieved by means of a select signal 58 which is input to the bus interface 59 of each of the phase counting assemblies 53a–d. Each select signal selects the output of one of the phase counters in one of the phase counting assemblies. The clock driving the phase 86 and select 58 buses should be fast enough to enable reading of all of the relevant phase counters in all of the phase counting assemblies in the specified interval. Another approach to the problem is illustrated in FIG. 7. In this configuration, a single latch signal is used to latch 64a–c the phase of each of the counters 62a–c in all of the phase-counting assemblies 53a–d simultaneously. The latched data 61a–c can then be read sequentially over a longer interval, by sending select signals 58 to the bus interface 63 for each of the relevant latches. Phase reading epochs, in which the phase data for all of the signals being tracked is read, occur at frequencies roughly between 1 and 100 Hz, depending on the requirements of the specific application.

The frequency synthesizer subassembly 65 for the receiver 3,4 is driven by a single crystal oscillator 66. Many different techniques are known in the art for generating a series of frequencies from the crystal oscillator input 67. One method of generating the desired frequencies of a receiver path for the Globalstar LEO constellation is discussed in section (VIII). A real-time clock 68 is maintained continuously, and generates time information for the microprocessor 56 to aid in the initial acquisition of satellites.

The microprocessor functions and memory for the user 4 and reference 3 receivers can be decomposed as illustrated in the block diagrams of FIGS. 9 and 10. Each microprocessor consists of a CPU 73a,b, memory 70a,b71a,b and a bus interface 74a,b through which to communicate with the rest of the receiver. The memory of the microprocessor stores the software routines 70a,b as well as the data 71a,b necessary for the implementation of those routines. We will first consider the software routines 70a for the user receiver.

70a.1—The initial acquisition algorithm performs a signal search routine to initially establish phase-lock on satellite signals. This involves using the satellite ephemeris data 71a.1, the GPS signal structure data 71a.2, the LEO signal structure data 71a.3, possibly the location of ground uplink stations 71a.4, together with data 75a–d from the tracking assemblies 44a–d to control the tracking modules such that phase lock is established on the available satellite signals. Control commands are applied via the select/control bus 76. The initial acquisition can also involve implementing frequency-locked loops as well as delay-locked loops, and is well-understood in the art.

70a.2—The maintenance of phase-locked loops involves controlling the components of the tracking assemblies 44a–d so that phase lock is maintained on all relevant signals. The microprocessor implements a control law for closing the phase-locked loops, and possibly, delay-locked loops for each of the tracking modules in use. These control techniques are well-understood in the art.

70a.3—Interpreting and demodulating data from the satellite downlinks involves using the data about the LEO 71a.3 and GPS signal structures 71a.2 to read and interpret the outputs of the tracking modules 75a–d.

70a.4—The carrier phase measurement routine is the process whereby carrier phase data is read from the phase counters of each of the phase-counting assemblies 53a–d and interpreted to produce phase measurements that can be input into the data-reduction routines 70a.6.

70a.5—The code phase measuring and positioning routine is the process whereby code phase data is read from the GPS tracking assembly 44a, corrected using the differential corrections received from the reference and processed to obtain a meter-level position estimate and clock offset estimate.

70a.6—The position calculation routine involves the correction of carrier phase measurements as well as an estimation algorithm. The correction of carrier-phase measurements is the process whereby carrier-phase data is corrected for deterministic disturbances based on information received from the reference, satellite ephemeris information 71a.1, possibly the location of ground uplink stations 71a.4 and possibly error prediction data 71a.5. The nature of these corrections are discussed in sections (VI.A, VII.A, VII.B). The estimation algorithm is the key process by which data is processed to identify the integer cycle ambiguities for the GPS satellites as well as related parameters for the LEO satellites, and to subsequently position the user with centimeter-level precision relative to the reference receiver 3. The algorithm employs the satellite ephemeris information 71a.1, the GPS signal structure data 71a.2 the LEO signal structure data 71a.3, and possibly the location of ground uplink stations 71a.4. The algorithm is discussed in detail in the section VI.B.

70a.7—Receiver autonomous integrity monitoring may be used by the receiver to independently check the validity of the position solution using the satellite ephemeris information. This technique is well-understood in the art and is described in more detail in section (VIII.B).

70a.8—A phase velocity measurement routine may be employed to enhance the position estimation methodology.

70a.9—Filtering position estimates involves applying to the position data a digital filter, which takes into account known aspects of the users' motion, such as bandwidth constraints, in order to generate more accurate, noise-free, position estimates. This could also involve the use of Kalman-filtering techniques to combine the carrier-phase position estimates with data obtained from other sensors such as accelerometers and gyros.

Most of the routines discussed also makes use of assorted miscellaneous variables 71a.6 We turn out attention now to the reference receiver, to discuss those routines which are not necessarily applicable for the user receiver.

70b.5—The LEO clock calibration routine is used to identify frequency offsets of the LEO satellite oscillators. The algorithm makes use of the satellite ephemeris information 71b.1, the GPS signal structure data 71b.2, the LEO signal structure data 71b.3 and possibly the location of ground uplink transmitters 71b.4 to identify the frequency offset of the LEO downlink due to the long-term instability of the satellite oscillator. The technique is detailed in section (VII.C).

70b.6—The code phase measurements and differential correction calculation involve reading the code phase measurements from the BPS tracking assembly 44a and combining this information with the known position data 71b.6 for the reference antenna 17d, to calculate differential corrections for the user.

70b.7—Transmitting data to the user is the process of coding and transmitting the data destined for the user receiver 4 in terms of the data communications protocol of the LRU 8 that is employed.

We have described the microprocessor operation assuming that all of the code is implemented on a single microprocessor. Another implementation might have multiple microprocessors in the receiver, each with specialized tasks. For example, a microprocessor for each tracking assembly might maintain signal tracking loops, while a separate microprocessor would be dedicated to the computation-intensive data reduction routines. Multiple permutation on this theme are possible.

VI. PRECISE POSITION CALCULATION
VI.A. Details of the Differential Carrier Phase Measurement The scenarios in which centimeter-level positioning accuracy is required within a few minutes of system initialization includes surveying, construction, precise control of land vehicles, as well as high-integrity tasks such as attitude determination and automatic landing of aircraft. The data reduction technique is similar in all cases, with simplifications for the context of a user receiver that is stationary in Earth-Based-Earth-Fixed (EBEF) coordinates. We will focus our attention on the more general case of a mobile user receiver 4, which is driven by a oscillator 66 that is distinct from that of the reference receiver 3. The purpose of this section is to characterize the software and hardware upon which centimeter-level navigation accuracy depends.

We denote the nominal carrier frequency of the satellite downlink as $\omega_s$. The phase of the satellite frequency synthesizer at time $t_s$ can be described:

$$\psi_s(t_s) = \omega_s t_s + \int^{t_s} \Delta\omega_s(\alpha) d\alpha \quad (10)$$

where $\Delta\omega_s(t_s)$ models the deviation from nominal frequency due to drift of the crystal oscillator onboard the satellite. We model this drift as a time-varying offset in the satellite clock $$\tau_s(t_s) = \frac{1}{\omega_s} \int^{t_s} \Delta\omega(\alpha) d\alpha.$$

Consequently, $$\psi_s(t_s) = \omega_s[t_s + \tau_s(t_s)] \quad (11)$$

Similar clock offsets occur at the user and reference receivers. At true times $t_u$ and $t_r$ the user and reference receivers respectively record times $t_u + \tau_u(t_u)$ and $t_r + \tau_r(t_r)$. Therefore, the phase output from the crystal oscillator 66 of the user's receiver 4 at time $t_u$ is $$\psi_X(t_u) = \omega_X[t_u + \tau_u(t_u)] \quad (12)$$

where $\omega_X$ is the nominal oscillator frequency. The frequency synthesizer 65 of the receiver generates the rf and if mixing signals by multiplying $\psi_X(t_u)$ by factors $\alpha_{rf}$ and $\alpha_{if}$ respectively. We denote the phase of the satellite signal emerging from the user receiver's LNA 22 at time $t_u$ as $\Psi_{su}(t_u)$. The output of the first mixer 26a–d, after bandpass filtering 25a–d, has phase $\Psi_1(t_u) = \Psi_{su}(t_u) - \alpha_{rf}\omega_X[t_u + t_u(t_u)]$. We assume for simplicity of explanation that the scheme of FIG. 4a is employed. Hence, the second mixer 40, after filtering 41, generates a signal with phase $\Psi_2(t_u) = \Psi_{su}(t_u) - (\alpha_{rf} + \alpha_{if}) \omega_X[t_u + \tau_u(t_u)]$. This phase is tracked by the phase-locked loop of the tracking module for satellite s, and is read from the corresponding phase counter by the microprocessor 56. Since the nominal satellite frequency is $\omega_s$, the nominal offset frequency of the signal tracked by the PLL is $\omega_o = \omega_s - (\alpha_{rf} + \alpha_{if})\omega_X$. The microprocessor 56 differences the phase it reads, $\Psi_2(t_u)$, with the phase component caused by this offset frequency, $\omega_0$. Since the microprocessor's measure of time interval is directly affected by crystal 66 instability, it calculates this phase component as $\omega_0[t_u + \tau_u(t_u)]$. The resulting phase measurement is $$\phi_{su}(t_u) = \omega_0[t_u + \tau_u(t_u)] - \Psi_2(t_u) - N_{su} 2\pi \quad (13)$$
$$= \omega_s[t_u + \tau_u(t_u)] - \Psi_{su}(t_u) - N_{su} 2\pi$$

where we have included an integer cycle phase ambiguity, $N_{su}$, since the microprocessor's initial phase measurement is modulus $2\pi$. Consider now the phase of the incident satellite signal, $\Psi_{su}$. The signal is affected by phase disturbances on the satellite-to-user path, as well as frequency-dependent phase lags in the receiver. In addition, the phase measured depends on the position of the satellite, $r_s$, at the time of transmission, rather than at the time of reception. Applying these factors to equ. (11), the phase of the signal from satellite s emerging from the LNA 22 of the user receiver 4 at time $t_u$ is:

$$\Psi_{su}(t_u) = \omega_s\left[t_u - \frac{1}{c}\rho_{su}\left(t_u - \frac{\rho_{su}(t_u - \ldots)}{c}\right)\right] + \quad (14)$$
$$\omega_s \tau_s\left(t_u - \frac{\rho_{su}(t_u - \ldots)}{c}\right) - \mu_{su} - n_{su}$$

where $\mu_{su}$ is the frequency-dependent phase delay of the receiver and $\eta_{su}$ is the error due to ionospheric and tropospheric delay as well as thermal noise and imperfect carrier-phase tracking in the receiver. $\eta_{su}$ Is actually time-varying, but we ignore this time dependence for now. In order to represent the signal path length, we have denoted by $\rho_{su}(t_0)$ the distance from user's current position at time $t_u$ to the satellite position at transmission time $t_o$, $\rho_{su}(t_o) = |r_u(t_u) - r_s(t_0)|$. Since we cannot know exactly the location from where a satellite transmitted if we do not know $t_o$, the precise calculation of $t_o$ requires an infinite regression. However, one can make the simplifying approximation.

$$t_u - \frac{1}{c}\rho_{su}\left(t_u - \frac{\rho_{su}(t_u - \ldots)}{c}\right) \approx t_u - \frac{1}{c}\rho_{su}(t_u) \quad (15)$$

which generates a worst-case ranging error <2 mm for satellites at 1400 km (the Global-star nominal orbital altitude). Therefore, from equ.'s (13) and (14) we estimate the user's phase measurement at time $t_u$.

$$\phi_{su}(t_u) = \frac{\omega_s}{c}\rho_{su}\left(t_u - \frac{\rho_{su}(t_u)}{c}\right) + \quad (16)$$
$$\omega_s\left[\tau_u(t_u) - \tau_s\left(t_u - \frac{\rho_{su}(t_u)}{c}\right)\right] - N_{su} 2\pi + \mu_{su} + n_{su}$$

The receiver assigns a timetag t to the measurement made at time $t_u$. Since the user receiver does not know true time $t_u$, the timetag will be effected by the clock offset of the receiver. The measurement must therefore be recast in terms of the clock of the user's receiver. If a user receiver makes code-phase measurements on the GPS signals, the clock offset in the receiver, $\tau_u(t_u)$, can be estimated to within 1 $\mu$sec. Once $\tau_u(t_u)$ has been estimated, two algorithmic approaches are possible. Firstly, one can use this estimate to select the times at which phase data is read from the phase counters in the receiver, so as to continually correct for the receiver's clock offset. This clock steering technique limits the magnitude of the timetag error, $|t-t_u|$, to roughly 1 $\mu$sec. Secondly, one can use the estimate of $\tau_u(t_u)$ to actively correct for any errors which would arise in the differential phase measurement. Since these approaches are conceptually very similar, we will describe the latter approach in detail. Once the issues are identified and resolved, it will be clear to one skilled in the art how the algorithm varies for the former approach.

Assume the user receiver 4 estimates its clock offset to be $\hat{\tau}_u$ using code-phase measurements. We assume for now that $\hat{\tau}_u$ is time-independent since it need not be continually updated. We define $\Delta\tau_u(t_u) = \tau_u(t_u) - \hat{\tau}_u$. For phase data read at true time $t_u$, the user receiver assigns a timetag $t = t_u + \Delta\tau_u$ $(t_u)+T_u$, where $T_u$ is a residual error in sampling time, distinct from the clock bias, resulting from the digital logic's imperfect precision in reading phase at the particular instant of time identified by the microprocessor. Recasting the measurement in terms of timetag t:

$$\phi_{su}(t_u) = \frac{\omega_s}{c} p_{su}\left(t - \Delta\tau_u(t_u) - T_u - \frac{1}{c}p_{su}(t - \Delta\tau_u(t_u) - T_u)\right) + \quad (17)$$
$$\omega_s \tau_u(t - \Delta\tau_u(t_u) - T_u) - N_{su}2\pi + \mu_{su} + n_{su} -$$
$$\omega_s \tau_s\left(t - \Delta\tau_u(t_u) - T_u - \frac{1}{c}p_{su}(t - \Delta\tau_u(t_u) - T_u)\right)$$

Since $|\Delta\tau_u(t_u)+T_u|$ is of the order of a few $\mu$sec, we may Taylor-expand to first order in $\Delta\tau_u(t_u)+T_u$, with negligible error in dropping the higher-order terms, $$\phi_{su}(t_u) \approx \frac{\omega_s}{c} p_{su}\left(t - \frac{p_{su}(t)}{c}\right) + \omega_s \tau_u(t) - \quad (18)$$
$$\frac{\omega_s}{c} \frac{\partial p_{su}(t)}{\partial t}[\Delta\tau_u(t) + T_u] - \omega_s \tau_s\left(t - \frac{p_{su}(t)}{c}\right) -$$
$$N_{su}2\pi + \mu_{su} + n_{su}$$

Note that for highly unstable oscillators, one might include in this expansion the terms $$-\omega_s \frac{\partial \tau_u(t)}{\partial t}[\Delta\tau_u(t) + T_u]$$

and $$-\omega_s \frac{\partial \tau_s(t)}{\partial t}[\Delta\tau_u(t) + T_u],$$

which could be incorporated into the estimation algorithm. However, these terms are negligible in most implementations of the invention.

A completely similar approach to the reference receiver's phase measurement yields the expansion $$\phi_{sr}(t_r) \approx \frac{\omega_s}{c} p_{sr}\left(t - \frac{p_{sr}(t)}{c}\right) + \omega_s \tau_r(t) - \quad (19)$$
$$\frac{\omega_s}{c} \frac{\partial p_{sr}(t)}{\partial t}[\Delta\tau_r(t) + T_r] - \omega_s \tau_s\left(t - \frac{p_{sr}(t)}{c}\right) - N_{sr}2\pi +$$
$$\mu_{sr} + n_{sr}$$

The reference receiver's phase measurement is time-tagged with a time t and transmitted (or otherwise communicated) to the user. The user matches the timetags on the data and performs a single difference, which we now index with the timetag t rather than a true time. The differential measurement is then $$\phi_s(t) = \phi_{su}(t_u) - \phi_{sr}(t_r) \quad (20)$$
$$\approx \frac{\omega_s}{c} p_{su}\left(t - \frac{p_{su}(t)}{c}\right) - \frac{\omega_s}{c} p_{sr}\left(t - \frac{p_{sr}(t)}{c}\right) +$$
$$\omega_s\left[\tau_s\left(t - \frac{p_{sr}}{c}\right) - \tau_s\left(t - \frac{p_{su}}{c}\right)\right] + \omega_s[\tau_u(t) - \tau_r(t)] -$$
$$\frac{\omega_s}{c} \frac{\partial p_{su}(t)}{\partial t}[\Delta\tau_u(t) + T_u] + \frac{\omega_s}{c} \frac{\partial p_{sr}(t)}{\partial t}[\Delta\tau_r(t) + T_r] -$$
$$(N_{su} - N_{sr})2\pi + (\mu_{su} - \mu_{sr}) + (n_{su} - n_{sr})$$

We may rewrite the terms involving $$\frac{\partial p_{su}}{\partial t}$$

and $$\frac{\partial p_{su}}{\partial t}$$

as $$\frac{\omega_s}{c} \frac{\partial p_{sr}(t)}{\partial t}[\tau_r(t) - \tau_u(t)] - \frac{\omega_s}{c} \frac{\partial p_{sr}(t)}{\partial t}[\hat{\tau}_r - \hat{\tau}_u] + \quad (21)$$
$$\frac{\omega_s}{c} \frac{\partial p_{sr}(t)}{\partial t}[T_r - T_u] + \left(\frac{\partial p_{sr}(t)}{\partial t} - \frac{\partial p_{su}(t)}{\partial t}\right)\frac{\omega_s}{c}[\Delta\tau_u(t) + T_u]$$

or equivalently as $$\frac{\omega_s}{c} \frac{\partial p_{su}(t)}{\partial t}[\tau_r(t) - \tau_u(t)] - \frac{\omega_s}{c} \frac{\partial p_{su}(t)}{\partial t}[\hat{\tau}_r - \hat{\tau}_u] + \quad (22)$$
$$\frac{\omega_s}{c} \frac{\partial p_{su}(t)}{\partial t}[T_r - T_u] + \left(\frac{\partial p_{sr}(t)}{\partial t} - \frac{\partial p_{su}(t)}{\partial t}\right)\frac{\omega_s}{c}[\Delta\tau_r(t) + T_r]$$

We will adopt the representation shown in equ. (21). It will be clear to one skilled in the art how the issues we describe can be transferred to equ. (22). The $1^{st}$ term in equ. (21) can lead to large errors and is incorporated into the estimation strategy. The $2^{nd}$ term in equ. (21) can be directly calculated, and subtracted from the differential measurement. If the user and reference receivers are implemented with similar digital logic, the term $|T_\tau - T_u|$ can be made less than 0.1 $\mu$sec. Hence the $3^{rd}$ term can be ignored with distance-equivalent errors <1 mm. Now consider the $4^{th}$ term. For a satellite at 1400 km, and a stationary user receiver 10 km from the reference, the term $$\left(\frac{\partial p_{sr}(t)}{\partial t} - \frac{\partial p_{su}(t)}{\partial t}\right) < 50 \text{ m/s}.$$

<50 m/s. To ensure that the $4^{th}$ term produces a worst-case distance-equivalent error <1 mm we must have $|\Delta\tau_u(t_u)+T_u|$<20 $\mu$sec, so that the term can be safely ignored. Consider the phase-reading scheme displayed in FIG. 6. The time interval required to read all of the active phase-counters of all of the active phase counter assemblies 53a–d contributes to the magnitude of the differentially uncompensated term $|\Delta\tau_u(t_u)+T_u|$. Hence, for a static user, this time interval should be roughly <18 $\mu$sec. However, for a mobile user receiver moving at, say, 250 m/s, the term $$\left(\frac{\partial p_{sr}(t)}{\partial t} - \frac{\partial p_{su}(t)}{\partial t}\right) < 300 \text{ m/s},$$

<300 m/s, and the time period should be roughly <3 $\mu$sec. That rate at which the estimate $\hat{\tau}_u$ needs to be updated so that $\Delta\tau_u(t)$ remains small depends on the stability of the receiver oscillator 66. For example, for a long-term oscillator stability of 1:$10^7$, updates every 2 minutes and every 20 seconds are sufficient for the static user and mobile user respectively.

The terms in equ. (20) relating to the satellite clock offset can be expanded to first order $$\omega_s\left[\tau_s\left(t - \frac{p_{sr}(t)}{c}\right) - \tau_s\left(t - \frac{p_{su}(t)}{c}\right)\right] \approx \frac{\partial \tau_s(t)}{\partial t} \frac{\omega}{c}(p_{sr}(t) - p_{su}(t)) \quad (23)$$

For a satellite oscillator with long-term frequency stability of $1:10^6$ we expect $$\frac{\partial \tau_s(t)}{\partial t}$$

to get as large as $10^{-6}$. This could cause distance-equivalent errors as large as 1 cm. In section (VII.C), we describe a technique for calibrating the frequency offset of the LEO satellite oscillator so that the first-order expansions of equ. (23). can be calculated and subtracted out of the phase measurement.

Eliminating all terms from measurement equ. (20) which are either negligible, or actively subtracted out of the measurement, the estimate of the resulting measurement is $$\bar{\phi}_s(t) \approx \frac{\omega_s}{c} p_{su}\left(t - \frac{p_{su}(t)}{c}\right) - \frac{\omega_s}{c} p_{sr}\left(t - \frac{p_{sr}(t)}{c}\right) + \omega_s\left(1 - \frac{1}{c}\frac{\partial p_{su}(t)}{\partial t}\right)[\tau_u(t) - \tau_r(t)] - (N_{su} - N_{sr})2\pi + (\mu_{su} - \mu_{sr}) + (n_{su} - n_{sr}) \quad (24)$$

To clarify the estimation strategy, we redefine the components of this measurement as follows:

$$\tau(t) = \tau_u(t) - \tau_r(t) \quad (25)$$

$$N_s = N_{su} - N_{sr} \quad (26)$$

$$\mu_s = \mu_{su} - \mu_{sr} \quad (27)$$

$$n_s = \frac{\lambda_s}{2\pi}(n_{su} - n_{sr}) \quad (28)$$

where $\lambda_s$ is the nominal wavelength of the satellite carrier. Multiplying equation (24) by $$\frac{\lambda_s}{2\pi}$$

to convert phase to a distance measurement, we then have $$y_s(t) = p_{su}\left(t - \frac{p_{su}(t)}{c}\right) - p_{sr}\left(t - \frac{p_{sr}(t)}{c}\right) + \left(1 - \frac{1}{c}\frac{\partial p_{su}(t)}{\partial t}\right)c\tau(t) - N_s\lambda_s + \frac{\lambda_s}{2\pi}\mu_s + n_s \quad (29)$$

VI.B. Estimation Strategy

If one attempts to estimate all of the integer components, $\{N_s\}$, as well as user position, $r_u(t)$ and clock biases $\tau(t)$, the complete set of parameters would be almost unobservable. The resulting estimation matrix would be poorly conditioned and highly susceptible to measurement noise $n_s$. Consequently, we select one of the Navstar satellites say satellite 1, to be a reference satellite for differencing. We make an initial approximation of the associated integer, $\hat{N}_1$ using equ. (24), based on our estimate of position and clock offset using code-phase measurements. Then, we adjust the measurement.

$$\bar{y}_s(t) = y_s(t) + \hat{N}_1 \quad (30)$$

and we redefine the parameters we seek to estimate as follows:

$$\bar{N}_s = \left(N_s - \frac{\mu_s}{2\pi}\right) - \frac{\lambda_1}{\lambda_s}\left(N_1 - \frac{\mu_1}{2\pi}\right) \quad (31)$$

$$\bar{\tau}(t) = \tau(t) - \frac{\lambda_1}{c}\left(N_1 - \hat{N}_1 - \frac{\mu_1}{2\pi}\right)$$

For the Navstar satellites, the new parameter $\bar{N}_s$ simply reduces to $N_s - N_1$ since all GPS satellites are transmitting similar frequencies. For the LEO satellites, the phase-delays do not cancel the parameters $\bar{N}_s$ cannot be regarded as having integer values. If $$\left|N_1 - \hat{N}_1 - \frac{\mu_1}{2\pi}\right| < 200 \text{ cycles,}$$

<200 cycles, the redefinition (31) leads to a maximum distance-equivalent error of <1 mm for satellites at 1400 km. The measurement can then be approximated:

$$\bar{y}_s(t) = p_{su}\left(t - \frac{p_{su}(t)}{c}\right) - p_{sr}\left(t - \frac{p_{sr}(t)}{c}\right) + \left(1 - \frac{1}{c}\frac{\partial p_{su}(t)}{\partial t}\right)c\bar{\tau}(t) - \bar{N}_s\lambda_s + n_s \quad (32)$$

where $\bar{N}_1$ is by definition 0.

The set of time-dependent parameters which we seek to estimate is $$\Theta(t) = [r_u(t)^T c\bar{\tau}(t)]^T \quad (33)$$

We create an observation matrix for these parameters based on our estimates of the line-of-sight vectors to the satellites $$h_s(t) = \left[\frac{\hat{p}_{su}\left(t - \frac{\hat{p}_{su}(t)}{c}\right)^T}{\hat{p}_{su}\left(t - \frac{\hat{p}_{su}(t)}{c}\right)} \quad 1 - \frac{1}{c}\frac{\partial \hat{p}_{su}(t)}{\partial t}\right] \quad (34)$$

For a current set of estimates, $\hat{\Theta}(t)$ and $\bar{N}_s$, we can construct an estimate of our prediction error for satellite s:

$$\Delta y_s(t) = \hat{p}_{su}\left(t - \frac{\hat{p}_{su}(t)}{c}\right) - p_{sr}\left(t - \frac{p_{sr}(t)}{c}\right) + \left(1 - \frac{1}{c}\frac{\partial \hat{p}_{su}(t)}{\partial t}\right)c\hat{\tau}(t) - \hat{\bar{N}}_s\lambda_s - \bar{y}_s(t) \quad (35)$$

Estimation matrices and prediction errors for all visible satellites are stacked into combined matrices, $$H(t) = \begin{bmatrix} h_1(t) \\ h_2(t) \\ \vdots \\ h_S(t) \end{bmatrix} \quad \Delta Y(t) = \begin{bmatrix} \Delta y_1(t) \\ \Delta y_2(t) \\ \vdots \\ \Delta y_S(t) \end{bmatrix} \quad (36)$$

where S is the total number of satellites visible. The batch measurement equation, involving measurements from $t_1$ through $t_N$ and the batch parameter update, $\Delta\hat{\Theta}$, can then be expressed as $$\Delta Y = H\Delta\hat{\Theta} + V \quad (37)$$

with the matrix structures $$\Delta Y = \begin{bmatrix} \Delta Y(t_1) \\ \Delta Y(t_2) \\ \vdots \\ \Delta Y(t_N) \end{bmatrix} \quad \Delta\hat{\Theta} = \begin{bmatrix} \Delta\hat{\Theta}(t_1) \\ \Delta\hat{\Theta}(t_2) \\ \vdots \\ \Delta\hat{\Theta}(t_N) \\ \Delta\overline{N}_2 \\ \vdots \\ \Delta\overline{N}_S \end{bmatrix} \quad (38)$$

$$H = \begin{bmatrix} H(t_1) & 0 & \cdots & & -\overline{\Lambda} \\ 0 & H(t_2) & 0 & \cdots & -\overline{\Lambda} \\ \vdots & & \ddots & & \vdots \\ 0 & \cdots & & H(t_N) & -\overline{\Lambda} \end{bmatrix}$$

where $$\overline{\Lambda} = \begin{bmatrix} 0 & \cdots & \cdots & 0 \\ \lambda_2 & 0 & \cdots & 0 \\ 0 & \lambda_3 & \cdots & 0 \\ 0 & & \ddots & 0 \\ 0 & \cdots & \cdots & \lambda_S \end{bmatrix} \quad (39)$$

The disturbance matrix V contains errors due to each satellite's measurement $n_s(t)$—which we may reasonably assume is uncorrelated with distribution $n_s(t) \sim N(0, \sigma_{ns}^2)$—as well as ephemeris errors $e_s(t)$ due to imperfect knowledge of the satellite's position which affects calculation of $\hat{p}_{su}$ and $p_{s\tau}$. Combining these two noise sources, the disturbance matrix has the form:

$$V = \begin{bmatrix} n_1(t_1) + e_1(t_1) \\ \vdots \\ n_S(t_1) + e_S(t_1) \\ n_1(t_2) + e_1(t_2) \\ \vdots \\ n_S(t_2) + e_S(t_2) \\ \vdots \end{bmatrix} \quad (40)$$

It should be noted that the matrix structures and parameters described above can be altered if the user receiver 4 is static relative to the reference receiver 3. This situation pertains, for example, in surveying applications, or any problem where a vehicle can remain stationary until good integer estimates are available. In such scenarios we need only estimate the 3 coordinates of $r_u(t_1)$. Given an estimate, $\hat{r}_u(t_1)$ of the initial position, our estimate of the position at time $t_n$ is simply $G(t_n-t_1)\hat{r}_u(t_1)$, where G is a rotation about the z-azis in EBEF coordinates, which accounts for the earth's rotation between time $t_n$ and $t_1$. To account for the reduction in the number of parameters, we define for each time t two separate stacked observation matrices:

$$H_1(t) = \begin{bmatrix} \hat{p}_{1u}\left(t - \frac{\hat{p}_{1u}(t)}{c}\right)^T \\ \hat{p}_{1u}\left(t - \frac{\hat{p}_{1u}(t)}{c}\right) \\ \vdots \\ \hat{p}_{Su}\left(t - \frac{\hat{p}_{Su}(t)}{c}\right)^T \\ \hat{p}_{Su}\left(t - \frac{\hat{p}_{Su}(t)}{c}\right) \end{bmatrix} \quad H_2(t) = \begin{bmatrix} 1 - \frac{1}{c}\frac{\partial \hat{p}_{1u}(t)}{\partial t} \\ \vdots \\ 1 - \frac{1}{c}\frac{\partial \hat{p}_{Su}(t)}{\partial t} \end{bmatrix} \quad (41)$$

We then structure the batch estimation matrix, H, as $$H = \begin{bmatrix} H_1(t_1) & H_2(t_1) & 0 & \cdots & -\overline{\Lambda} \\ H_1(t_2)G(t_2 - t_1) & 0 & H_2(t_1) & 0 & \cdots & -\overline{\Lambda} \\ \vdots & & & 0 & \ddots & \vdots \\ H_1(t_N)G(t_N - t_1) & 0 & \cdots & & H_2(t_N) & -\overline{\Lambda} \end{bmatrix} \quad (42)$$

and the batch parameter update matrix, $\Delta\hat{\Theta}$ as $$\Delta\hat{\Theta} = [\Delta\hat{r}_x(t_1)\Delta\hat{r}_y(t_1)\Delta\hat{r}_z(t_1)c\Delta\hat{\tau}(t_1) \ldots c\Delta\hat{\tau}(t_N)\Delta\overline{N}_2 \ldots \Delta\overline{N}_S]^T \quad (43)$$

and we may proceed with a batch measurement equation as in (37) above.

Once the estimation problem has been formulated in the manner of equ. (37) the solution can be well-conditioned. The good conditioning is due to the geometric diversity resulting from the motion of the LEO satellites. This geometric diversity decreases the condition number of the estimation matrix H $$\kappa(H) = \frac{\sigma_{max}(H)}{\sigma_{min}(H)} \quad (44)$$

where $\sigma_{min}(H)$ and $\sigma_{max}(H)$ are the minimum and maximum singular values of H. The condition number indicates the sensitivity of the parameter solution to disturbances V as well as to errors in the estimation matrix, $\delta H$. This concept can be made more concrete by considering the $\| \|_2$ norm of the parameter estimate errors for a simple least-squares parameter solution. Imagine $\Delta\hat{\Theta}_*$ is the parameter update solution of the least-squares problem with these error sources removed:

$$\Delta\hat{\Theta}_* = \arg\min_{\Delta\Theta \in \mathcal{R}^{4N+S-1}} \|(H - \delta H)\Delta\Theta - (\Delta Y - V)\|_2 \quad (45)$$

while $\Delta\hat{\Theta}_{LS}$ is the actual least-squares solution found.

$$\Delta\hat{\Theta}^{LS} = \arg\min_{\Delta\Theta \in \mathcal{R}^{4N+S-1}} \|H\Delta\Theta - \Delta Y\|_2 \quad (46)$$

It can be shown (see Golub [18]) that if $$\epsilon = \max\left\{\frac{\|\delta H\|_2}{\|H\|_2}, \frac{\|V\|_2}{\|\Delta Y\|_2}\right\} < \kappa(H) \quad (47)$$

and $$\sin\beta = \frac{\|H\Delta\Theta_{LS} - \Delta Y\|_2}{\|\Delta Y\|_2} \tag{48}$$

then $$\frac{\|\Delta\Theta_{LS} - \Delta\Theta_*\|_2}{\|\Delta\Theta_{LS}\|_2} \leq \epsilon\kappa(H)\left(\frac{2}{\cos(\beta)} + \tan(\beta)\kappa(H)\right) \tag{49}$$

For one skilled in the art, equ. (49) indicates how small $\kappa(H)$ should be for a given $\epsilon$ in order to achieve a desired level of accuracy in the parameter estimates.

VI.C Mathematical methods for solving the estimation problem

Many different mathematical methods can yield a solution to the problem posed in equ. (37). A method can be chosen depending on the processing power available in the receiver and the requirements of the specific application. Some of these different approaches are discussed below. These in no way represent a complete set of techniques; rather they highlight some key methods. The parameter solution found by any of these method would be well-conditioned due to the geometric diversity achieved by the LEOS, based on the reasoning of equ. (49).

VI.C.1 Maximum Likelihood Update

We assume now that our estimated parameter set $\hat{\Theta}$ is near enough the true parameter solution that there are negligible errors due to higher order terms, incurred in linearizing the measurement equation to derive (37). Based thereupon, we seek the maximum likelihood update:

$$\Delta\hat{\Theta}_{ML} = \arg\max_{\Theta \in \mathbb{R}^{4N+S-1}} \text{Prob}\{\Delta Y \mid \Delta\hat{\Theta}\} \tag{50}$$

This ML update requires knowledge of the measurement covariance matrix. Since the ephemeris errors are strongly correlated, the covariance matrix $C=E\{VV^T\}$ has non-diagonal structure. Over the course of 5 minutes of tracking, one can roughly model the satellite position generated from the ephemeris data as $$\hat{r}_s(t) = r_s(t) + \Delta r_s \tag{51}$$

where $\Delta r_s$ is a constant offset, modeling the difference between a satellite's true position and the position estimate based on the ephemeris data. We describe this offset vector in terms of normally distributed components:

$$\Delta r = [\Delta x \; \Delta y \; \Delta z]^T, \Delta x, \Delta y, \Delta z \sim N(0, \sigma_e^2). \tag{52}$$

This error in the ephemeris data would result in an ephemeris disturbance—see equ. (40):

$$e_s(t) = (p_{su}(t) - p_{sr}(t)) - (\hat{p}_{su}(t) - \hat{p}_{sr}(t)) \tag{53}$$

$$\approx -\frac{\Delta r_s(t)^T r_{su}(t)}{r_{su}(t)} + \frac{\Delta r_s(t)^T r_{sr}(t)}{r_{sr}(t)} \tag{54}$$

where the approximation is achieved with a first-order expansion, assuming that $\|\Delta r_s\|_2 \ll r_{su}, r_{sr}$. Using this first-order approximation, we find the second moment of the ephemeris disturbance statistics:

$$E\{e_s(t_1)e_s(t_2)\} = \sigma_e^2 \left[ \frac{r_{su}(t_1)^T r_{su}(t_2)}{r_{su}(t_1)r_{su}(t_2)} + \frac{r_{sr}(t_1)^T r_{sr}(t_2)}{r_{sr}(t_1)r_{sr}(t_2)} - \frac{r_{su}(t_1)^T r_{sr}(t_2)}{r_{su}(t_1)r_{sr}(t_2)} - \frac{r_{sr}(t_1)^T r_{su}(t_2)}{r_{sr}(t_1)r_{su}(t_2)} \right] \tag{55}$$

$$= \sigma_{es}^2(t_1, t_2)$$

Consequently, the batch covariance matrix C will have structure:

$$C = \begin{bmatrix} C_n + C_e(t_1) & C_e(t_1, t_2) & C_e(t_1, t_3) & \cdots \\ C_e(t_2, t_1) & C_n + C_e(t_2) & C_e(t_2, t_3) & \cdots \\ C_e(t_3, t_1) & C_e(t_3, t_2) & C_n + C_e(t_3) & \ddots \\ \vdots & \vdots & \ddots & \ddots \end{bmatrix} \tag{56}$$

where $$C_e(t_i, t_j) = \begin{bmatrix} \sigma_{e1}^2(t_i, t_j) & & 0 \\ & \ddots & \\ 0 & & \sigma_{eS}^2(t_i, t_j) \end{bmatrix} \tag{57}$$

$$C_n = \begin{bmatrix} \sigma_{n1}^2 & & 0 \\ & \ddots & \\ 0 & & \sigma_{nS}^2 \end{bmatrix} \tag{58}$$

Given matrix C, the ML parameter update is:

$$\Delta\hat{\Theta}_{ML} = (H^T C^{-1} H)^{-1} H^T C^{-1} \Delta Y \tag{59}$$

In essence, this iterative estimation strategy is the Gauss-Newton technique, where we have pre-multiplied the batch estimation equation (37) by the whitening matrix $C^{-1/2}$ to achieve the ML update. Since the measurements in equ. (32) are only mildly nonlinear in $r_u$, 2–3 iterations are sufficient to converge to the experimental noise floor.

VI.C.2 Least-Squares Batch Solution via Choletsky Factorization

The technique described above for solving the ML estimation problem requires $O(N^3)$ flops. Many techniques exist for reducing the computation time required by exploiting the sparse structure of the measurement matrix H. One such technique is discussed in this section. In order to preserve sparseness, we ignore the off-diagonal terms of the batch covariance matrix of equ. (56), to obtain a diagonal matrix $\overline{C}$. We may pre-multiply the batch measurement equation by the diagonal scaling matrix $(\overline{C})^{-1/2}$ and then solve the least-squares problem. Since $(\overline{C})^{-1/2}$ does not change the block structure of H, we will not explicitly show the premultiplication by $(\overline{C})^{-1/2}$, or equivalently assume the $\overline{C}$ is simply the identity, $I_{NS}$. We may then solve the least-squares problem of equ. (46) by solving $$H^T H \Delta\hat{\Theta} = H^T \Delta Y \tag{60}$$

The matrix $A=H^TH$ has the block structure $$\begin{bmatrix} A_{1,1} & 0 & \cdots & \cdots & A_{1,N+1} \\ 0 & A_{2,2} & 0 & \cdots & A_{2,N+1} \\ \vdots & 0 & A_{3,3} & & A_{3,N+1} \\ \vdots & \vdots & & \ddots & \vdots \\ A_{N+1,1} & A_{N+1,2} & A_{N+1,3} & \cdots & A_{N+1,N+1} \end{bmatrix} \quad (61)$$

where the submatrices $\{A_{i,i}\}$, $i<N+1$ are 4×4, $\{A_{N+1,i}\}$ are $(S-1)\times 4$ and $A_{N+1,N+1}$ is $(S-1)\times(S-1)$. We seek a lower triangular matrix, L, such that $LL^T=A$, with structure $$L = \begin{bmatrix} L_{1,1} & 0 & \cdots & \cdots & 0 \\ 0 & L_{2,2} & 0 & \cdots & 0 \\ \vdots & 0 & \ddots & & \vdots \\ \vdots & \vdots & & L_{N,N} & \vdots \\ L_{N+1,1} & L_{N+1,2} & \cdots & L_{N+1,N} & L_{N+1,N+1} \end{bmatrix} \quad (62)$$

where the submatrices $\{L_{i,i}\}$, $i<N+1$ are 4×4 lower triangular, $\{L_{N+1,i}\}$ are $(S-1)\times 4$ and $L_{N+1,N+1}$ is $(S-1)\times(S-1)$ lower triangular. This matrix can be found via Choletsky Block Factorization, which is achieved with the following algorithm:

for $j = 1, N+1$
  for $i = j, N+1$
    $S = A_{i,j} - \sum_{k=1}^{j-1} L_{i,k} L_{j,k}^T$
    if $i = j$
      compute by Choletsky factorization $L_{j,j}$ s.t. $L_{j,j} L_{j,j}^T = S$
    else
      solve $L_{i,j} L_{j,j}^T = S$ for $L_{i,j}$
    end
  end
end Once L is found, $\Delta\hat{\Theta}$ can be found by block back-substitution.

VI.C.3 Iterative Information Smoothing

Despite the computational efficiency, sparse matrix batch algorithms are difficult to administer when satellites are coming in/out of view, or cycle slips occur, while data is being stacked for processing. Information smoothing might be selected for its flexibility in dealing with such situations. In essence, the information smoother passes the linear Kalman filter forward and backwards over the data before updating the parameter set. We describe the set of parameters as $$\Delta X(t) = \begin{bmatrix} \Delta\Theta(t) \\ \Delta\tilde{N} \end{bmatrix} \quad (63)$$

where $\Delta\overline{N} = [\Delta\overline{N}_2 \ldots \Delta\overline{N}_S]^T$. We model the evolution of parameters between phase measurements as a Gauss-Markow process $$\Delta X(t_k) = \Delta X(t_{k-1}) + W(t_k) \quad (64)$$

where $$E\{W(t_k)W(t_k)^T\} = Q(t_k) \quad (65)$$

$$= \lim_{\sigma_\omega \to \infty} \begin{bmatrix} L_4 \sigma_\omega^2 & 0 \\ 0 & 0 \end{bmatrix}$$

This process is based upon the idea that the integers are constant for all phase measurements and that no assumption is made about the user's motion between measurements. The phase prediction error of equ. (36) we model with a linear approximation:

$$\Delta Y(t_k) = H(t_k)\Delta X(t_k) + V(t_k) \quad (66)$$

where $$E\{V(t_k)V(t_k)^T\} = R(t_k) = \begin{bmatrix} \sigma_{el}(t_k)^2 + \sigma_{nl}^2 & \cdots & 0 \\ \vdots & \ddots & \\ 0 & & \sigma_{eS}(t_k)^2 + \sigma_{nS}^2 \end{bmatrix} \quad (67)$$

Denoting the covariance of our estimate $\Delta\hat{X}(t_k)$ as $P(t_k)$, the Kalman filtering equations for this system are:

$$P(t_k)^{-1} = (P(t_{k-1}) + Q(t_{k-1}))^{-1} + H(t_k)^T R(t_k)^{-1} H(t_k) \Delta$$

$$\hat{X}(t_k) = \Delta\hat{X}(t_{k-1}) + P(t_k) H(t_k)^T R(t_k)^{-1} (\Delta Y(t_k) - H(t_k) \Delta\hat{X}(t_{k-1})) \quad (68)$$

If phase-lock is attained on a new satellite s during parameter estimation, the initial covariance of the parameter estimate $\Delta^-N_s$ is very large; this can cause computational difficulties. Consequently, we use instead an information form of the Kalman filter where we define an information matrix $$S(t) = P(t)^{-1} = \begin{bmatrix} S_\Theta(t) & S_{\Theta\overline{N}}(t) \\ S_{\Theta\overline{N}}(t)^T & S_{\overline{N}}(t) \end{bmatrix} \quad (69)$$

and an information vector $Z(t) = S(t)\Delta X(t)$. Applying these definitions to equations (65) and (68), it is straightforward to show that the update equations become:

$$S(t_k) = \begin{bmatrix} 0 & 0 \\ 0 & S_{\overline{N}}(t_{k-1}) - S_{\Theta\overline{N}}(t_{k-1})^T S_\Theta(t_{k-1})^{-1} S_{\Theta\overline{N}}(t_{k-1}) \end{bmatrix} + \quad (70)$$

$$H(t_k)^T R(t_k)^{-1} H(t_k)$$

$$\hat{Z}(t_k) = \begin{bmatrix} 0 \\ \hat{Z}_{\overline{N}}(t_{k-1}) - S_{\Theta\overline{N}}(t_{k-1})^T S_\Theta(t_{k-1})^{-1} Z_{\Theta\overline{N}}(t_{k-1}) \end{bmatrix} +$$

$$H(t_k)^T R(t_k)^{-1} \Delta Y(t_k)$$

In order to emulate the batch solution, the filter is passed forward and backward over the data. For the backward pass, we simply interchange the $t_{k-1}$ and $t_k$ in equ. (70), and start with initial conditions $S(t_N)=0$ and $\hat{Z}(t_N)=0$. The $S(t_k)$ and $\hat{Z}(t_k)$ from forward and backward passes are linearly combined.

$$S(t_k) = S(t_k)^F + S(t_k)^B \quad (71)$$

$$\hat{Z}(t_k) = \hat{Z}(t_k)^F + \hat{Z}(t_k)^B \quad (72)$$

and the parameter updates are then found according to $\Delta\hat{X}(t_k) = S(t_k)^{-1}\hat{Z}(t_k)$. The integer updates are found from the relevant vectors in $\Delta\hat{X}(t_1)$ or $\Delta\hat{X}(t_N)$. This process is repeated until the elements of $\Delta X(t_k)$ are negligibly small.

VI.C.4 Solving the Max. Likelihood Problem with Integer Parameters

All of the techniques discussed thus far treat the integer parameters as real numbers in the estimation strategy. In this section, we discuss a technique for solving the least squares problem assuming an integer parameter set. Assume that our current parameter estimates are close to the ML solution, so that no iteration is necessary and we drop the $\Delta$ notation. Consider the batch measurement of equ. (37) rewritten as $$Y = H_\theta \theta + H_z z + V \tag{73}$$

where $H_\theta$ and $H_z$ are the estimation matrices for the real and integer parameters respectively, $\theta$ is the matrix of real parameters, $z$ is $q \times 1$ matrix of integer parameters, and $V$ is the disturbance matrix with covariance $C$. Imagine equ. (73) is premultiplied by the whitening matrix $C^{-\frac{1}{2}}$, and the least-squares solution is found, with the approximation that $z$ contain real elements. The resulting estimate of $z$ can be shown to be normally distributed, $\hat{z} \sim N(z, \Phi)$ where $$\Phi = [H_z^T C^{-1} H_z - H_z^T C^{-1} H_\theta (H_\theta^T C^{-1} H_\theta)^{-1} H_\theta^T C^{-1} H_z]^{-1} \tag{74}$$

We can consider the least-square solution $\hat{z}$ to be generated by $\hat{z} = z + u$ where $u$ is the disturbance term. Multiplying by the whitening matrix $$G = \Phi^{-\frac{1}{2}},$$

we have $\bar{z} = Gz + \bar{u}$ where $\bar{u} \sim N(0, I_q)$. The maximum likelihood estimate of $z$ is then $$z_{ML} = \arg \min_{z \in Z^{q \times 1}} \|\bar{z} - Gz\|_2 \tag{75}$$

$G$ forms the basis, or generation matrix, of a lattice $L(G) = \{Gz | z \in Z^{q \times 1}\}$ which is conceptually illustrated in FIG. 11 for $q=2$. Given the lattice $L(G)$, 108, we can find an integer-valued matrix $F$ which maps $F: Z^{q \times 1} \to Z^{q \times 1}$ such that $|\det(F)| = 1$ and $L(GF) = L(G)$, 108. Given the matrix $G$, the algorithm of Lenstra, Lenstra and Lovász (LLL) can be used to find an $F$ such that the generation matrix $\bar{G} = GF$ has two key properties:

The columns of $\bar{G}$, $\{g_i\}$, are almost orthogonal, namely $$g_j = \sum_{i=1}^{j} \mu_{ji} g_i^*, \mu_{jj} = 1, |\mu_{ji}| < \frac{1}{2} \text{ for } i \neq j$$

where $\{g_i^*\}$ are the columns of $\bar{G}^*$, the Gramm-Schmidt orthogonalization of $\bar{G}$.

$\| \|_2$ norms of the collumns of $\bar{G}$ are bounded, namely $\|g_1\|_2 \ldots \|g_q\|_2 \leq 2^{q(q-1)/4} |\det(G)|$ and $\|q_i\|_2 < 2^{(q-1)/4} q \sqrt{|\det(G)|}$.

Before actually determining the integer solution, we desire a lower bound on the $\text{Prob}(z_{ML} = z)$. To determine this, we seek the radius 107, $$\frac{d_{min}}{2},$$

of the largest ball 106 that fits within a Voroni cell 109 of lattice L 108. If $\bar{G}$ is orthogonalized using the Gram-Schmidt algorithm to $\bar{G}^* = [g_1^* g_2^* \ldots g_q^*]$, a lower bound on $d_{min}$ can be found:

$$d_{min} \geq \min\{\|g_1^*\|_2, \|g_2^*\|_2, \ldots \|g_q^*\|_2\} \tag{76}$$

By redefining the generation matrix $\bar{G} \leftarrow GF$, we tighten the bound of equ. (76). The sum-of-squares of $q$ independent normally distributed unit variance random variables is a $\chi^2$ distribution with $q$ degrees of freedom. We denote by $F_{\chi^2}(\chi^2; q)$ the cumulative distribution function of a $\chi^2$ random variable with $q$ degrees of freedom. Once we have a bound on $d_{min}$, $d$, we can find a lower bound on the probability of correct integer selection:

$$\text{Prob}\{z_{ML} = z\} \geq F_{\chi^2}\left(\frac{d^2}{4}; q\right) \tag{77}$$

We return now to the integer least-squares estimation problem of equ. (75). Replacing $G$ by $\bar{G}$, the expression can be rewritten as $$z_{ML} = \arg \min_{z \in Z^{q \times 1}} (z - \hat{z})^T P^{-1} (z - \hat{z}) \tag{78}$$

where $\hat{z} = \bar{G}^{-1} \bar{z}$ and $P = (\bar{G}^T \bar{G})^{-1}$. If $P$ is diagonal, then the expression becomes $$z_{ML} = \arg \min_{z \in Z^{q \times 1}} \sum_{i=1}^{q} \frac{(z_i - \hat{z}_i)^2}{P_{ii}} \tag{79}$$

in which case we can simply find the integers by rounding: $z_{MLi} = \lceil z_i \rfloor$. Since $\bar{G}$ is almost orthogonal, we can use the rounding of $\hat{z}$ as an initial suboptimal estimate of $z_{ML}$, $z_{sub}$. Since we have the lower bound $$\frac{d_{min}}{2}$$

from equ. (76), we know that if $\|\bar{z} - \bar{G} z_{sub}\|_2 < d_{min}/2$ then $z_{sub}$ is the global minimum $z_{ML}$. Consequently, an efficient algorithm for attaining the global minimum is as follows:

* Perform the LLL on the collumns of G to generate a unimodular matrix F and create a new lattice generator matrix $\bar{G} = GF$ which is almost orthogonal.

$z_{sub} \leftarrow F\lceil \bar{G}^{-1} \bar{z} \rfloor$. If $\|\bar{z} - \bar{G} z_{sub}\|_2 < \frac{d_{min}}{2}$ then $z_{ML} = z_{sub}$ and stop.

* Using the algorithm of Babai [22], find a new $z_{sub}$, such that $$\bar{z} - \bar{G} z_{sub} = \sum_{i=1}^{q} \lambda_i g_i^* \text{ with } |\lambda_i| < \frac{1}{2}.$$

If $\|\bar{z} - \bar{G} z_{sub}\|_2 < \frac{d_{min}}{2}$ then $z_{ML} = z_{sub}$ and stop.

* $\tau \leftarrow \|\bar{z} - \bar{G} z_{sub}\|_2$ and $z^* \leftarrow F^{-1} z_{sub}$
* while 1
  * Search for an integral point inside an ellipsoid $\|\bar{z} - Gz\|_2 < \tau$. If no such point exists $z_{ML} \leftarrow F z^*$ and stop.
  * Let $z^*$ be the integral point found in the previous step.
    $\tau \leftarrow \|\bar{z} \ldots \bar{G} z^*\|_2$.

If $r \leq \frac{d_{min}}{2}$ then $z_{ML} \leftarrow F z^*$ and stop.

*end.

Once the parameter $\{\overline{N}_s\}$ are identified using any of the techniques discussed above, they can be regarded as constant biases. The receiver uses these estimates in equ. (35) to construct prediction error estimates with which to update position estimates with centimeter-level precision in real time. One straightforward method of doing this is $$\Delta\hat{\Theta}(t_k) = (H(t_k)^T R(t_k)^{-1} H(t_k))^{-1} H(t_k)^t R(t_k)^{-1} \Delta Y(t_k) \tag{80}$$

VII. IMPLEMENTING THE INVENTION WITH DIFFERENT COMMUNICATION CONFIGURATIONS

VII.A. Satellites with Multiple-Beam Downlinks

In section (VI), it was assumed that each satellite footprint was constructed with a single beam so that continuous carrier-phase data could be accumulated over the duration of tracking. However, rather than transmit a single beam for the satellite's footprint, as in the GPS case, many LEOS transmit multiple beams. As shown in FIG. 12 which roughly resembles the Globalstar downlink, each beam 79a–d covers a portion of the satellite footprint 78. We may assume that each beam 79a–d is modulated differently, and has a phase offset relative to adjacent beams. Imagine a receiver moves from beam a to beam b 80. There arises an interval of a few seconds between reaching the 3 dB-down point of beam b 81 and the 3 dB-down point of beam a 82. During this interval, the receiver simultaneously tracks both beams. Before handover from beam a to beam b at time $t_0$, the receiver calculates the phase different between the two beams, $\phi_a(t_0) - \phi_b(t_0)$. The receiver then adds this difference to the phase measured on beam b at some later time $t_1$. The sum then becomes $\phi_a(t_0) + [\phi_b(t_1) - \phi_a(t_0)]$, which is corrected for any offset between the beams.

VII.B. Compensating for the effects of a bent-pipe communication payload

We have assumed in section (VI) that the signal arises onboard the satellite. However, for a bent-pipe communication payload, the satellite actually downconverts and then retransmits signals received from ground-based uplink stations. This does not change the conceptual approach, but simply requires that additional terms be taken into account in the estimation strategy. An example of a bent-pipe system configuration, such as that of Globalstar, is illustrates in FIG. 13. Consider the phase of the signal 84a,b generated at the ground terminal 83a,b:

$$\Psi_g(t_g) = \omega_g[t_g + \tau_g(t_g)] \tag{81}$$

We will ignore $\tau_g$ since its effect on the differential phase measurement is negligible. Using similar reasoning to that of section (VI.A), the phase of the uplink signal 84a,b incident at the satellite 2a,b at time $t_s$ can be described:

$$\Psi_{gs}(t_s) = \omega_g \left( t_s - \frac{1}{c} p_{gs}(t_s) \right) + \nu_{gs} \tag{82}$$

Where $p_{gs}(t_s)$ is the distance from the ground terminal to the satellite at time $t_s$; the expression $$t_s - \frac{1}{c} p_{gs}(t_s)$$

describes the time at which the transmission was made; and $\nu_{gs}$ represents all the phase disturbances on the path from ground to satellite, which will almost cancel out in the differential measurement. The satellite downconverter mixes the incident signal with another at frequency $\omega_g - \omega_s$. The phase of the down-converted signal which the satellite transmits is then $$\Psi_s(t_s) = \omega_s[t_s + \tau_s(t_s)] - \frac{\omega_g}{c} p_{gs}(t_s) - \omega_g \tau_s(t_s) + \nu_{gs} \tag{83}$$

The phase of the satellite signal output from the LNA 22 of the user's receiver 4 at time $t_u$ is then approximately $$\Psi_{su}(t_u) = \omega_s \left( t_u - \frac{1}{c} p_{su}\left(t_u - \frac{p_{su}(t_u)}{c}\right) \right) + \nu_{gs} + \nu_{su} + \tag{84}$$
$$(\omega_s - \omega_g)\tau_s\left(t_u - \frac{p_{su}(t_u)}{c}\right) - \frac{\omega_g}{c} p_{gs}\left(t_u - \frac{p_{su}(t_u)}{c}\right)$$

where $\nu_{su}$ contains all the phase disturbances on the satellite-to-user path. Consequently, we find the user's phase measurement corresponding to equ. (16).

$$\phi_{su}(t_u) = \omega_s \tau_u(t_u) + \frac{\omega_s}{c} p_{su}\left(t_u - \frac{p_{su}(t_u)}{c}\right) + \tag{85}$$
$$(\omega_g - \omega_s)\tau_s\left(t_u - \frac{p_{su}(t_u)}{c}\right) + \frac{\omega_g}{c} p_{gs}\left(t_u - \frac{p_{su}(t_u)}{c}\right) -$$
$$\nu_{gs} - \nu_{su} - N_{su} 2\pi$$

Similarly, the phase measurement made at the reference at time $t_r$ is $$\phi_{sr}(t_r) = \omega_s \tau_r(t_r) + \frac{\omega_s}{c} p_{sr}\left(t_r - \frac{p_{sr}(t_r)}{c}\right) + \tag{86}$$
$$(\omega_g - \omega_s)\tau_s\left(t_r - \frac{p_{sr}(t_r)}{c}\right) + \frac{\omega_g}{c} p_{gs}\left(t_r - \frac{p_{sr}(t_r)}{c}\right) -$$
$$\nu_{gs} - \nu_{sr} - N_{sr} 2\pi$$

As discussed in section (VI.A), the user matches the tags on the measurements, and performs the single difference:

$$\phi_s(t) = \phi_{su}(t_u) - \phi_{sr}(t_r) \tag{87}$$

Using a Taylor expansion and discarding all insignificant high-order terms, as in section (VI.A), we can recast the measurement in terms of the assigned timetags. The resultant representation of the measurement, corresponding to equ. (20) is:

$$\phi_s(t) \approx \frac{\omega_s}{c} p_{su}\left(t - \frac{p_{su}(t)}{c}\right) - \frac{\omega_s}{c} p_{sr}\left(t - \frac{p_{sr}(t)}{c}\right) - \tag{88}$$
$$\frac{\omega_s}{c} \frac{\partial p_{su}(t)}{\partial t} [\Delta \tau_u(t) + T_u] + \frac{\omega_s}{c} \frac{\partial p_{sr}(t)}{\partial t} [\Delta \tau_r(t) + T_r] +$$
$$\omega_s[\tau_u(t) - \tau_r(t)] +$$
$$(\omega_g - \omega_s)\left[\tau_s\left(t - \frac{p_{su}(t)}{c}\right) - \tau_s\left(t - \frac{p_{sr}(t)}{c}\right)\right] -$$
$$\frac{\omega_g}{c} \frac{\partial p_{gs}(t)}{\partial t} [\Delta \tau_u(t) + T_u - \Delta \tau_r(t) - T_r] -$$

-continued $$\frac{\omega_g}{c}\frac{\partial p_{gs}(t)}{\partial t}\left(\frac{p_{su}(t)}{c} - \frac{p_{sr}(t)}{c}\right) - v_{su} + v_{sr} - N_{su}2\pi + N_{sr}2\pi$$

We will consider those terms in the expression which have been introduced by the bent-pipe architecture and cause equ. (88) to differ from equ. (20). Consider the terms $$(\omega_g - \omega_s)\left[\tau_s\left(t - \frac{p_{su}(t)}{c}\right) - \tau_s\left(t - \frac{p_{sr}(t)}{c}\right)\right] \qquad (89)$$

involving the instabilities of the satellite oscillators. All that has changed from equ. (20) is the multiplication factor, which is now $(\omega_g - \omega_s)$ instead of $-\omega_s$. Therefore, the treatment of this term is similar to that of equ. (23).

Consider the terms in equ. (88) involving $$\frac{\partial p_{gs}}{\partial t}.$$

We rewrite these terms as:

$$-\frac{\omega_g}{c}\frac{\partial p_{gs}(t)}{\partial t}[\tau_u(t) - \tau_r(t)] + \frac{\omega_g}{c}\frac{\partial p_{gs}(t)}{\partial t}[\hat{\tau}_u - \hat{\tau}_r] - \qquad (90)$$
$$\frac{\omega_g}{c}\frac{\partial p_{gs}(t)}{\partial t}[\tau_u - T_r] - \frac{\omega_g}{c}\frac{\partial p_{gs}(t)}{\partial t}\left(\frac{p_{su}(t)}{c} - \frac{p_{sr}(t)}{c}\right)$$

The $2^{nd}$ can be directly calculated if the position of the ground station and the satellite ephemerides are known; hence it can be actively subtracted out of the measurement. The $3^{rd}$ term can be ignored, using similar argruments to those of section (VI.A). The $4^{th}$ term is directly calculable if the receiver knows the satellite ephemeris, the location of the ground uplink, and the rough position of the user using code-phase measurements. Consequently, the fourth term is also calculated and actively subtracted out of the differential measurement. Only the $1^{st}$ term must be directly estimated.

Eliminating all terms from equ. (88) which are either negligible, or actively subtracted out, the estimate of the resulting measurement corresponding to equ. (24) is $$\overline{\phi}_s(t) \approx \frac{\omega_s}{c}p_{su}\left(t - \frac{p_{su}(t)}{c}\right) - \frac{\omega_s}{c}p_{sr}\left(t - \frac{p_{sr}(t)}{c}\right) + \qquad (91)$$
$$\omega_s\left(1 - \frac{1}{c}\frac{\partial p_{sr}(t)}{\partial t} - \frac{\omega_g}{\omega_s c}\frac{\partial p_{gs}(t)}{\partial t}\right)[\tau_u(t) - \tau_r(t)] -$$
$$(N_{su} - N_{sr})2\pi + (\mu_{su} - \mu_{sr}) + (n_{su} - n_{sr})$$

Following the steps outlined in section (VI.A) and section (VI.B), we find the measurement approximation corresponding to equ. (32):

$$\overline{y}_s(t) = p_{su}\left(t - \frac{p_{su}(t)}{c}\right) - p_{sr}\left(t - \frac{p_{sr}(t)}{c}\right) + \qquad (92)$$
$$\left(1 - \frac{1}{c}\frac{\partial p_{su}(t)}{\partial t} - \frac{\omega_g}{\omega_s c}\frac{\partial p_{gs}(t)}{\partial t}\right)c\overline{\tau}(t) - \overline{N}_s\lambda_s + n_s$$

The observation matrix for the time-varying parameters, corresponding to equ. (34), becomes $$h_s(t) = \left[\frac{\hat{p}_{su}\left(t - \frac{\hat{p}_{su}(t)}{c}\right)^T}{\hat{p}_{su}\left(t - \frac{\hat{p}_{su}(t)}{c}\right)} 1 - \frac{1}{c}\frac{\partial \hat{p}_{su}(t)}{\partial t} - \frac{\omega_g}{\omega_s c}\frac{\partial p_{gs}(t)}{\partial t}\right] \qquad (93)$$

Similarly, the estimate of our prediction error, corresponding to equ. (35) becomes $$\Delta y_s(t) = \hat{p}_{su}\left(t - \frac{\hat{p}_{su}(t)}{c}\right) - p_{sr}\left(t - \frac{\hat{p}_{sr}(t)}{c}\right) + \qquad (94)$$
$$\left(1 - \frac{1}{c}\frac{\partial \hat{p}_{su}(t)}{\partial t} - \frac{\omega_g}{\omega_s c}\frac{\partial p_{gs}(t)}{\partial t}\right)c\hat{\tau}(t) - \hat{\overline{N}}_s\lambda_s - \overline{y}_s(t)$$

and we may proceed with the estimation as described in section (VI.B).

VII.C. Unstable Oscillators: Calibrating the LEO Oscillator using Navstar Satellites In this section, we describe how the frequency offset, or clock offset rate of the LEO oscillator can be calibrated using a GPS signal. This algorithm is only necessary for oscillators that have long-term frequency stabilities of $1:10^6$ or worse. Some of the mathematical steps are closely related to those described in detail above, so these stages have been left out of the explanation. The technique described here has been designed to be implemented completely with software, and requires no additional front-end hardware in the receiver. We will assume a bent-pipe communication architecture for generality; the additional terms can simply be dropped for simpler systems.

We can describe the phase measurements made for a bent-pipe LEO satellite L, 2a–c, and a Navstar satellite N 1a–d at the reference receiver 3 as:

$$\phi_{L\tau}(t_r) = \omega_L[t_r + T_r(t_r)] - \Psi_{L\tau}(t_r) - N_{L\tau}2\pi \qquad (95)$$

$$\phi_{N\tau}(t_r) = \omega_N[t_r + T_r(t_r)] - \Psi_{N\tau}(t_r) - N_{N\tau}2\pi \qquad (96)$$

In order to cancel out the error due to the receiver's oscillator 66 drift, the microprocessor 56 performs a weighted difference between the phase of the two satellite signals to find a calibration phase $$\phi_c(t_\tau) = \phi_{L\tau}(t_\tau) - \frac{\omega_L}{\omega_N}\phi_{N\tau}(t_\tau) \qquad (97)$$

The incident phase from each of the the satellites may be described:

$$\Psi_{L\tau}(t_\tau) = \omega_L\left(t_\tau - \frac{1}{c}p_{L\tau}\left(t_\tau - \frac{p_{L\tau}(t_\tau)}{c}\right)\right) - \frac{\omega_g}{c}p_{gL}\left(t_\tau - \frac{p_{L\tau}(t_\tau)}{c}\right) + \qquad (98)$$
$$(\omega_L - \omega_g)\tau_L\left(t_\tau - \frac{p_{L\tau}(t_\tau)}{c}\right) - \mu_{L\tau} - n_{L\tau}$$

$$\Psi_{N\tau}(t_\tau) = \omega_N\left(t_\tau - \frac{1}{c}p_{N\tau}\left(t_\tau - \frac{p_{N\tau}(t_\tau)}{c}\right)\right) + \omega_N\tau_N\left(t_\tau - \frac{p_{N\tau}(t_\tau)}{c}\right) - \mu_{N\tau} - n_{N\tau}$$

where the subscript g refers to the ground uplink station 83a,b, discussed in section (VII.B). The resultant expression for the weighted difference is found to be:

$$\phi_c(t_r) = \omega_L\tau_N\left(t_\tau - \frac{p_{N\tau}(t_\tau)}{c}\right) - \frac{\omega_L}{c}p_{N\tau}\left(t_\tau - \frac{p_{N\tau}(t_\tau)}{c}\right) + \qquad (99)$$

-continued $$\frac{\omega_L}{c} p_{L\tau}\left(t_\tau - \frac{p_{L\tau}(t_\tau)}{c}\right) + \frac{\omega_g}{c} p_{gL}\left(t_\tau - \frac{p_{L\tau}(t_\tau)}{c}\right) +$$

$$(\omega_g - \omega_L)\tau_L\left(t_\tau - \frac{p_{L\tau}(t_\tau)}{c}\right) - N_{L\tau}2\pi + \frac{\omega_L}{\omega_N} N_{N\tau}2\pi +$$

$$\mu_{L\tau} - \frac{\omega_L}{\omega_N}\mu_{N\tau} + n_{L\tau} - \frac{\omega_L}{\omega_N} n_{N\tau}$$

The $2^{nd}$, $3^{rd}$ and $4^{th}$ terms are directly calculated and subtracted from the measurement by the reference receiver which knows the location of the ground uplink station, as well as that of the LEO and Navstar satellite. After subtracting out these terms, the calibration measurement becomes:

$$\overline{\phi}_c(t_r) = (\omega_g - \omega_L)\tau_L\left(t_\tau - \frac{p_{L\tau}(t_\tau)}{c}\right) + \omega_L\tau_N\left(t_r - \frac{p_{N\tau}(t_\tau)}{c}\right) - \quad (100)$$

$$N_{L\tau}2\pi + \frac{\omega_L}{\omega_N} N_{N\tau}2\pi + \mu_{L\tau} - \frac{\omega_L}{\omega_N}\mu_{N\tau} + n_{L\tau} -$$

$$\frac{\omega_L}{\omega_N} n_{N\tau}$$

For the purpose of this calibration, we consider the LEO's clock offset, $T_L$, to be a linear function of time as a result of a frequency offset in the satellite oscillator. Since the GPS clock is atomic, we regard $T_N$ as constant. The reference receiver calculates the change in calibration phase $\Delta\overline{\phi}_c$ over an interval of roughly one second, $\Delta t$, to find $$\frac{\Delta\overline{\phi}_c}{\Delta t} \approx (\omega_g - \omega_L)\frac{\partial\tau_L}{\partial t} \quad (101)$$

from which $$\frac{\partial\tau_L}{\partial t}$$

can be calculated with good accuracy.

VII.D. LEO Satellites using TDMA Downlinks

It should be noted that the fundamental technique of augmenting GPS with LEOS for geometric diversity is equally applicable to TDMA downlinks, where the LEO satellite signals 6a,b arrive in bursts of a few μsec. The time from the start of one burst to the start of the next is termed the scan period, $T_s$. The time during of each burst is termed the receive time, $T_r$. It has been demonstrated that continuous carrier-phase tracking of GPS C/A code-type signals can be achieved with high integrity for $T_r$=2 msec, and $T_s$=12 msec. Although LEOS signals show more Doppler shift than GPS signals, it is well known in the art that a $3^{rd}$ order phase-locked loop can be implemented to maintain a running estimate of phase φ, phase rate $$\frac{\partial\phi}{\partial t},$$

and phase acceleration $$\frac{\partial^2\phi}{\partial t^2}.$$

Hence, the change in phase due to satellite motion can be estimated over $T_s$ to maintain phase lock. Two fundamental limitations on the technique exist. The first concerns the stability of the satellite and receiver oscillators required to guarantee that cycle slips do not occur between bursts. If A is the Allen variance of limiting oscillator, we require $$\frac{A\omega_s T_s}{2\pi} \ll 1 \quad (102)$$

For Ka band downlinks for which $$\frac{\omega_s}{2\pi} \approx 30 \text{ GHz},$$

and $T_s \approx 25$ msec, we require A $\ll 1.3\times10^{-9}$. The second limitation involves aliasing due to the dynamics of the receiver platform. For $T_s$32 25 msec, for example, the highest frequency component of the platform dynamics should not exceed half of the corresponding sampling frequency, or 20 Hz. Neither of these constraints is restrictive for the majority of applications.

VII.E. Non-GPS Navigation Signals

In our discussion of the carrier-phase positioning algorithm, we have assumed that LEOS are used to augment the Navstar GPS satellite fleet. It should be noted that Navstar GPS satellites have utility to the extend that they provide:

Additional carrier-phase signal sources, which in essence provide additional equations so that the parameter-estimation problem is over-determined.

Code-phase navigation signals which allow for correlation of the user and reference receiver clocks to better than ~1 μsec and also enable the receivers to achieve initial position estimates accurate to the meter-level.

Other navigation satellites exist, and are planned, which could also fulfill both of these functions. Such systems include Russia's Glonass, and Europe's proposed Satellite Civilian Navigation System which will include a LEO segment with highly stable downlink frequencies. Our system of exploiting LEO satellites for geometric diversity is equally applicable to these other navigation satellites. For the general case of a mobile user, 4 such navigation signals should be available. If another means is used to initially synchronize the reference and receiver clocks, specialized code phase navigation signals become unnecessary.

The technique described in section(VI) can resolve integer cycle ambiguities on carrier-phase signals for a mobile user so long as a total of 5 satellites are in view. Ideally, to rapidly constrain all the degrees of freedom in the positioning problem, 2 or more of these satellites should be in Low Earth Orbit.

VII.F. Non-Differential Position Estimates

The essential technique of augmenting GPS with LEOS for geometric diversity is equally applicable to the non-differential setting. To examine how a user receiver might proceed with non-differential position estimation, consider the first-order expansion of the phase measurement in equ. (18)

$$\phi_{su}(t_u) \approx \frac{\omega_s}{c} p_{su}\left(t - \frac{p_{su}(t)}{c}\right) + \omega_s\tau_u(t) - \frac{\omega_s}{c}\frac{\partial p_{su}(t)}{\partial t}[\tau_u(t) + T_u] -$$

$$\omega_s\tau_s\left(t - \frac{p_{su}(t)}{c}\right) - N_{su}2\pi + \mu_{su} + n_{su}$$

Since there is no need to initially estimate and compensate for clock offset, $\hat{T}_u$ has been dropped from the expression. The term $$\frac{\omega_s}{c} \frac{\partial p_{su}(t)}{\partial t} T_u$$

can be ignored with distance-equivalent error of <1 mm for $|T_u|<0.1$ μsec and satellites at 1400 km. Consider now $$\tau_s\left(t - \frac{p_{su}(t)}{c}\right).$$

For highly stable satellite oscillators, such as atomic oscillators, the user can be conveyed the necessary information to model the clock term. Alternatively, a highly stable clock can be modeled linearly as $T_s(t)=T_{s0}+T_{s1}t$. Using the clock-calibration technique described in section (VII.C), the user may directly estimate and subtract out the term $$\left(t - \frac{p_{su}(t)}{c}\right)\tau_{s1}.$$

Using Ionospheric/Tropospheric models and/or dual frequency ionospheric calibration, the user receiver could estimate and largely subtract out the error terms $n_{su}$, leaving a residual $\Delta n_{su}$. Converting the resultant estimate to distance-equivalent form, $$y_{su}(t_u) = p_{su}\left(t_u - \frac{p_{su}(t_u)}{c}\right) + \left(1 - \frac{1}{c}\frac{\partial p_{su}(t_u)}{\partial t}\right)c\tau_u(t_u) - \quad (103)$$

$$c\tau_{s0} - \lambda_s N_{su} + \frac{\lambda_s}{2\pi}\mu_{su} + \Delta n_{su}$$

Using one of the Navstar satellites, say satellite 1, as a reference satellite for differencing, we make similar redefinitions to those described in section (VI.B)

$$\overline{y}_{su}(t_u) = y_s(t_u) + \hat{N}_{1u} \quad (104)$$

$$\overline{N}_{su} = \left(N_{su} - \frac{\mu_{su}}{2\pi} + \frac{c\tau_{s0}}{\lambda_s}\right) - \frac{\lambda_1}{\lambda_s}\left(N_{1u} - \frac{\mu_{1u}}{2\pi}\right)$$

$$\overline{\tau}_u(t_u) = \tau_u(t_u) - \frac{\lambda_1}{c}\left(N_{1u} - \hat{N}_{1u} - \frac{\mu_{1u}}{2\pi}\right)$$

For the Navstar satellites, for which $T_{s0}=0$, the new parameter $\overline{N}_{su}$ remains integer-valued. The measurement may then be described $$\overline{y}_{su}(t_u) = p_{su}\left(t_u - \frac{p_{su}(t_u)}{c}\right) + \left(1 - \frac{1}{c}\frac{\partial p_{su}(t_u)}{\partial t}\right)c\tau_u(t_u) - \quad (105)$$

$$\lambda_s \overline{N}_{su} + \Delta n_{su}$$

One skilled in the art could then proceed with a similar estimation strategy to that described in section (VI.B), with the positioning accuracy depending primarily on the magnitude of $\Delta n_{su}$.

VIII. EXAMPLE IMPLEMENTATION OF THE INVENTION: AUGMENTING GPS WITH THE GLOBALSTAR TELECOMMUNICATIONS CONSTELLATION

VIII.A. The necessary criteria for cm-level positioning

In order for a LEO constellation to rapidly resolve cycle ambiguities with integrity for a mobile user, the following criteria should be fulfilled:

There should ideally be 2 or more LEO satellites available for tracking.

A carrier signal should be traceable for a time period of a few minutes.

The satellite ephemerides should be known to good accuracy.

The SNR ratios should be sufficient for accurate carrier phase estimation.

All of these criteria are fulfilled by the Globalstar Constellation. Carrier phase from one satellite can be tracked for several minutes at a time. In addition, the constellation has GPS sensors onboard so the ephemerides can be estimated to <20 m rms. FIG. 14 describes the percentage availability of the satellites at different latitudes. Note that there are always 2 satellites available above $10^{deg}$ elevation over the continental United States.

VIII.B. Integrity with RAIM

In all availability and performance analyses, we assume that the LEOS are functional, and that no cycle slips occur over the tracking duration. For high-integrity applications, this assumption cannot be made, and position solutions would be independently validated via receiver autonomous integrity monitoring (RAIM). In essence, the RAIM algorithm checks if the residual of the least-squares solution at each time t, $\|\Delta Y(t) - H(t)\Delta\Theta(t)\|$, is greater than some threshold R. R is set to meet a continuity requirement—that is, not to exceed the allowed number of false alarms of system malfunction caused by regular measurement noise. For a given acceptable error radius a, we can only guarantee that RAIM will alert us to position errors $\|\hat{r}_u(t) - r_u(t)\| > a$ using the threshold R for given satellite geometries. FIG. 15 addresses the availability of such geometries with respect to latitude to alert for radial errors of 1.1 m while allowing a continuity risk of $2\times10^{-6}$ per 15 sec. These results were for $122.17^{deg}$ West. We assume that GPS is augmented only with the Globalstar Constellation. A conservative phase noise variance of 1.4 cm, and phase reading rate of 5 Hz are assumed.

VIII.C. A Joint GPS/Globalstar Reference Transceiver

Each Globalstar satellite downlink contains 13 1.23 MHz bands, spanning 2483.5 MHz to 2500 MHz in the S-band. Each band supports 128 CDMA channels, one of which harbors a pilot signal, the modulation of which can be described by equ. (1). In this context, D(t) refers to an outer PN sequence of length 288 which is chipped at 1.2K cps. $C_I(t)$ is created from the sum of 2 inner PN sequences, each of length $2^{10}$, which is then filtered to a 1.23 MHz bandwidth. $C_Q(t)$ is a different code, created in a similar manner to $C_I(t)$. FIG. 16 illustrates an architecture for the joint GPS and Globalstar reference receiver 3, together with a transmitter subsection 90. The rf filter 23 has a center frequency of $f_G$=2492 MHz and a bandwidth of roughly 75 MHz. The $f_{Grf}$ 24 and $f_{Gif}$ 28 mixing frequencies can be generated using an integer-N synthesizer 89 with a dual modulus prescaler. The if mixing scheme 27 adheres to that of FIG. 4b. The signal is filtered 36 to a pre-correlation two-sided bandwidth, $B_c$ of less than ≈2.5 MHz. In-phase and quadrature sampling 37 of the Globalstar signal occurs at $f_s$≈20 MHz, the clock speed 99 of the Globalstar tracking assembly 88 circuitry. In the preferred embodiment, the LRU 8 is implemented using a ground-based transmitter 90 which employs a VHF rf carrier frequency $f_r$. The $f_r$ carrier signal 96 is generated by the frequency synthesizer 89. The data modulation section 91 is controlled by the microprocessor 56 via the data/control bus 93. Data is modulated onto the carrier using PSK modulation at a rate of 9600 baud. The signal is then amplified 94 and transmitted via a VHF antenna 95.

VIII.D. Primary Error Sources for Precise Navigation

This section gauges those additional sources of error which cannot be directly estimated by the data reduction algorithm of section VI.A. We provide only enough detail to roughly calibrate the sources of error.

VIII.D.1 Receiver Phase-Tracking Errors

We will gauge this error using equ. (9), since the filtering of the Globalstar inner PN sequences does not have a substantial effect on the phase tracking performance. It is prudent, for most implementations of the invention, to select a narrow phase-locked loop bandwidth $B_L \approx 10$ Hz. This $B_L$ enables a second-order phase-locked loop with damping ratio $\zeta \approx 0.7$ to track phase acceleration of $100.2\pi \text{rad/sec}^2$ with an error <0.1 rad. For a receiver noise figure of roughly 3 dB, the nominal Globalstar transmission archives $$\frac{A^2}{2N_o} = 37.5 \, \text{dB} - \text{Hz. At } B_L = 10 \, \text{Hz,}$$

we expect a 1-σ phase error due to thermal noise or roughly 0.12 rad.

VIII.D.2 Ionospheric Errors

The distance-equivalent group delay due to the ionosphere can be as large 20 m. However, if a differential carrier-phase measurement is taken as in equ. (20), and the user and reference are within 10 km, the resultant error is governed by local irregularities in the ionospheric structure, which delay the signal to the user and reference station by different amounts. For S-band transmissions, and a user-reference separation of d km, we estimate the resultant phase error as a normally distributed random process of zero mean and variance $\lambda^2 4.4 \times 10^{-4} \text{d rad}^2$, where $\lambda$ is the wavelength in cm. This leads to 1-σ phase deviations on Globalstar signals of 0.25 rad and 0.57 rad for distances of 1 km and 5 km respectively. The corresponding GPS deviations are 0.44 rad and 0.99 rad respectively.

VIII.D.3 Tropospheric Errors

Without any form of differential correction, the delays cause by the troposphere at a satellite elevation of $10^{deg}$ are roughly 14 m. With differential measurement, and a baseline separation of d km<10 km the remaining tropospheric delay can be roughly modeled as a normal distribution ~N(0 cm,$(0.1 \, d)^2 \, \text{cm}^2$).

VIII.D.4 Ephemeris Errors

For the Globalstar satellites, we expect the ephemeris disturbances discussed in section (VI.A) to be bounded by 1.5 cm and 7.2 cm for d of 1 km and 5 km respectively. The ephemerides of the GPS satellites are known to within roughly 10 m rms; the resulting ephemeris errors are bounded by 0.05 cm and 0.25 cm respectively.

VIII.E. Expected performance of a System Using only the Globalstar Constellation To illustrate the performance of the invention, we discuss a Monte-Carlo simulation which indicates the behavior of a system augmenting GPS with the Globalstar Satellites. Separate simulations are conducted for separations between user and reference station of 1 km and 5 km. The simulations are all conducted assuming the user is in Palo Alto, Calif., and is capable of seeing all satellites above $10^{deg}$ elevation. For this study, conservative disturbances were assumed due to ionospheric and tropospheric delay, thermal noise, ephemeris errors, and oscillator instabilities. For each simulation, the assumed time of the experiment was varied, sequentially sampling the interval of 12 hours, roughly one period of the Navstar satellite orbits. For each simulation, the user receiver is ascribed velocity and displacement from the reference receiver in a random direction. It was assumed that the user's motion was relatively slow, so that the user-reference separation was roughly constant over the course of tracking.

FIG. 17 displays the 1-σ deviation of radial position errors as a function of tracking time for a mobile user. The parameter estimates were found using equ. (59). Each point corresponds to the mean error deviation averaged over 200 simulations. FIG. 18 displays the evolution of the lower bound on the probability of selecting the correct set of integers for the Navstar satellites in view over the tracking period. Each point in this figure represents the worst case for 200 simulations. This lower probability bound is calculated according to the technique discussed in section (VI.C.4). Once the integers are correctly identified, a user may rely completely on GPS measurements were ephemeris errors are negligible. Since the measurement errors for each satellite are roughly distributed as ~$N(0, \sigma_{ns}^2)$, the positioning error deviation for a static user decreases roughly as $$\propto \frac{1}{\sqrt{N}}$$

where N is the number of measurements taken on each satellite.

"The present invention has been described in terms of a preferred embodiment. The invention, however, is not limited to the embodiment depicted and described. Rather, the scope of the invention is defined by the appended claims."

What is claimed is:

1. A method for estimating a position of a user device in a satellite-based navigation system, the method comprising:
    transmitting carrier signals from a set of satellites, wherein the set of satellites includes a set of LEO satellites;
    accumulating and sampling at a reference station the carrier signals to obtain reference carrier phase information comprising geometrically diverse reference carrier phase information from the set of LEO satellites;
    accumulating and sampling at the user device the carrier signals to obtain user carrier phase information comprising geometrically diverse user carrier phase information from the set of LEO satellites; and
    calculating the precise position of the user device based on the reference carrier phase information and the user carrier phase information, wherein the geometrically diverse reference carrier phase information and geometrically diverse user carrier phase information from the set of LEO satellites are used to resolve parameters related to integer cycle ambiguities in the reference carrier phase information and the user carrier phase information.

2. The method of claim 1 further comprising:
    receiving code signals from a set of navigation satellites;
    measuring at the reference station the code signals to obtain reference code phase information;
    measuring at the user device the code signals to obtain user code phase information;
    estimating user and reference clock biases from the user and reference code phase information; and
    correcting for clock offsets using the estimated user and reference clock biases.

3. The method of claim 1 further comprising initializing a device navigation algorithm by estimating an approximate user position using code phase signals received from a set of navigational satellites.

4. The method of claim 1 further comprising communicating differential code phase correction data and the reference carrier phase information from the reference station to the user device.

5. The method of claim 1 further comprising communicating LEO satellite ephemeris data to the user device directly from the reference station, or using a satellite data link.

6. The method of claim 1 wherein the step of calculating the precise position of the user device comprises predicting present reference carrier phase information based on past reference carrier phase information.

7. The method of claim 1 wherein the step of calculating the precise position of the user device comprises compensating for frequency dependent phase delay differences between navigation carrier signals and LEO carrier signals in user and reference receiver circuits.

8. The method of claim 1 wherein the step of accumulating and sampling the carrier signals at the user device comprises reading navigation carrier information and LEO carrier information within a predetermined time interval selected in dependence upon an expected motion of the user device and the motion of the set of LEO satellites.

9. The method of claim 1 wherein the calculating step comprises accounting for a carrier phase offset between two LEO beams from a single LEO satellite.

10. The method of claim 1 wherein the calculating step comprises calibrating LEO oscillator instabilities using navigation satellite information.

11. The method of claim 1 wherein the calculating step comprises compensating for phase disturbances resulting from a bent pipe LEO communication architecture.

12. The method of claim 1 further comprising the step of monitoring the integrity of the calculating step.

13. A satellite-based navigation system comprising:
    a set of satellites to transmit carrier signals, wherein the set of satellites includes a set of LEO satellites;
    a reference station to track the carrier signals to obtain reference carrier phase information comprising geometrically diverse reference carrier phase information from the set of LEO satellites;
    a user device including a receiver to track the carrier signals to obtain user carrier phase information comprising geometrically diverse user carrier phase information from the set of LEO satellites and a microprocessor to calculate a precise position of the user device based on the reference carrier phase information and the user carrier phase information, wherein the microprocessor uses the geometrically diverse reference carrier phase information and geometrically diverse user carrier phase information from the set of LEO satellites to resolve parameters related to integer cycle ambiguities in the reference carrier phase information and user carrier phase information; and
    a communications link between the reference station and the user device.

14. The system of claim 13 wherein the set of satellites further comprises a set of navigational satellites and wherein the communications link conveys differential code phase correction data and the reference carrier phase information from the reference station to the user device.

15. The system of claim 13 wherein the communications link conveys LEO satellite ephemeris data to the user device from the reference station.

16. A user device for providing satellite-based navigation, the device comprising:
    at least one antenna to couple to carrier signals transmitted from a set of satellites wherein the set of satellites includes a set of LEO satellites;
    a first receiver for to track the carrier signals to accumulate and sample carrier phase information comprising geometrically diverse user carrier phase information from the LEO satellites;
    a second receiver, not necessarily distinct from the first receiver, to obtain reference carrier phase information transmitted from a reference station, wherein the reference carrier phase information comprises geometrically diverse reference carrier phase information from the set of LEO satellites; and
    a microprocessor to calculate a position of the user device based on the reference carrier phase information and the user carrier phase information, wherein the microprocessor uses the geometrically diverse reference carrier phase information and geometrically diverse user carrier phase information from the set of LEO satellites to resolve parameters related to integer cycle ambiguities in the reference carrier phase information and user carrier phase information.

17. The device of claim 16 wherein:
    the set of satellites further comprises navigation satellites;
    the first receiver measures navigation code signals to obtain user code phase information;
    the second receiver receives reference code phase information transmitted from the reference station; and
    the microprocessor estimates user and reference clock biases from the user code phase information and reference code phase information, and uses the estimated clock biases to correct for clock offset errors.

18. The device of claim 16 wherein the first receiver reads navigation carrier phase information and LEO carrier phase information at times separated by no more than a predetermined time interval which is dependent upon expected movement of the device and the movement of the LEO satellites.

19. A user device for providing satellite-based navigation, the device comprising:
    at least one antenna to couple to signals transmitted from a set of satellites, wherein the set of satellites includes a set of navigation satellites and a set of LEO satellites;
    a receiver to track the signals to obtain code phase information and carrier phase information comprising geometrically diverse carrier phase information from the set of LEO satellites; and
    a microprocessor to calculate a position of the user device based on the code phase information and the carrier phase information, wherein the microprocessor uses the geometrically diverse carrier phase information from the set of LEO satellites to resolve parameters related to integer cycle ambiguities in the carrier phase information from the set of navigation satellites.

* * * * *

UNITED STATES PATENT AND TRADEMARK OFFICE
CERTIFICATE OF CORRECTION

PATENT NO. : 6,373,432 B1
DATED : April 16, 2002
INVENTOR(S) : Matthew Rabinowitz It is certified that error appears in the above-identified patent and that said Letters Patent is hereby corrected as shown below:

Column 1,
Line 15, "This invention was reduced to practice with support from NASA under contract number NASA8-39225. The U.S. Government has certain rights in the invention" should read -- This invention was reduced to practice with support from NASA under contract number NASA8-39225 and from FAA under contract number 97G-012. The U.S. Government has certain rights in the invention --

Signed and Sealed this

Fifteenth Day of June, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,373,432 B1 | Page 1 of 1 |
| APPLICATION NO. | : 09/625419 | |
| DATED | : April 16, 2002 | |
| INVENTOR(S) | : Rabinowitz et al. | |

It is certified that error appears in the above-identified patent and that said Letters Patent is hereby corrected as shown below:

Column 1:

Replace lines 15-17 with:

-- FEDERALLY-SPONSORED RESEARCH OR DEVELOPMENT
This invention was made with Government support under contracts NAS8-39225 awarded by the NASA Marshall Space Flight Center and 97G-012 awarded by the Federal Aviation Administration. The Government has certain rights in this invention. --

Signed and Sealed this
Twelfth Day of April, 2011

David J. Kappos
*Director of the United States Patent and Trademark Office*